United States Patent [19]
Havens et al.

[11] Patent Number: 5,732,263
[45] Date of Patent: Mar. 24, 1998

[54] SYSTEMS, METHODS AND COMPUTER PROGRAM PRODUCTS FOR GENERATING AND VALIDATING USER DEFINED OBJECT CLASSES IN AN OBJECT ORIENTED PROGRAMMING ENVIRONMENT AFTER BUILD TIME

[75] Inventors: George Lee Havens, Louisburg; Jay Douglas Stouffer, Raleigh; Helen Robie Seabold, Cary; Meredith Smith Vaughan, Raleigh, all of N.C.

[73] Assignee: International Business Machines Corporation, Armonk, N.Y.

[21] Appl. No.: 538,314

[22] Filed: Oct. 3, 1995

[51] Int. Cl.⁶ .................................................. G06F 17/30
[52] U.S. Cl. ..................... 395/614; 395/611; 395/685; 395/703; 395/710
[58] Field of Search ........................... 395/614, 611, 395/604, 603, 685, 703, 710

[56] References Cited

U.S. PATENT DOCUMENTS

| | | | |
|---|---|---|---|
| 5,151,987 | 9/1992 | Abraham et al. | 395/575 |
| 5,161,223 | 11/1992 | Abraham | 395/600 |
| 5,161,225 | 11/1992 | Abraham et al. | 395/600 |
| 5,247,669 | 9/1993 | Abraham et al. | 395/600 |
| 5,265,206 | 11/1993 | Shackelford et al. | 395/200 |
| 5,280,610 | 1/1994 | Travis, Jr. et al. | 395/600 |
| 5,295,256 | 3/1994 | Bapat | 395/500 |
| 5,313,630 | 5/1994 | Namioka et al. | 395/600 |
| 5,313,633 | 5/1994 | Tomita et al. | 395/700 |
| 5,327,562 | 7/1994 | Adcock | 395/700 |
| 5,339,430 | 8/1994 | Lundin et al. | 395/685 |
| 5,341,478 | 8/1994 | Travis, Jr. et al. | 395/200 |
| 5,404,525 | 4/1995 | Endicott et al. | 395/702 |
| 5,418,964 | 5/1995 | Conner et al. | 395/700 |
| 5,437,025 | 7/1995 | Bale et al. | 395/600 |
| 5,446,902 | 8/1995 | Islam | 395/700 |
| 5,481,718 | 1/1996 | Ryu et al. | 395/700 |
| 5,504,892 | 4/1996 | Atsatt et al. | 385/614 |
| 5,522,071 | 5/1996 | Guillen et al. | 395/650 |
| 5,581,761 | 12/1996 | Radia et al. | 395/702 |
| 5,606,700 | 2/1997 | Anthias et al. | 395/683 |

OTHER PUBLICATIONS

James O. Coplien; *Advanced C++ Programming Styles and Idioms;* Chapter 8; pp. 279–306; (1992).

*Primary Examiner*—Thomas G. Black
*Assistant Examiner*—Jean R. Homere
*Attorney, Agent, or Firm*—John J. Timar; Myers, Bigel, Sibley & Sajovec

[57] ABSTRACT

User-created object classes may be generated after build-time without requiring modification to and recompiling of the program code. Every class within an object oriented programming environment is assigned a unique class identifier. Every class within a particular hierarchy is assigned a selector identifier. The exemplary class comprises a registration table having a vendor class portion and a user class portion. Classes defined at build-time are registered in the vendor portion of the registration table. User-created object classes are assigned selector identifiers having values of existing classes. These selector identifiers, along with the respective name of the user-created object class, are registered in the user class portion of the registration table. The instantiation of objects from user-created object classes is handled by searching the user class portion of the registration table prior to the vendor class portion. Object validation is achieved by searching the subclass table of the object class for the appropriate class identifier.

22 Claims, 16 Drawing Sheets

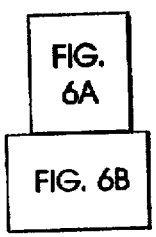
FIG. 6
FIG. 6A
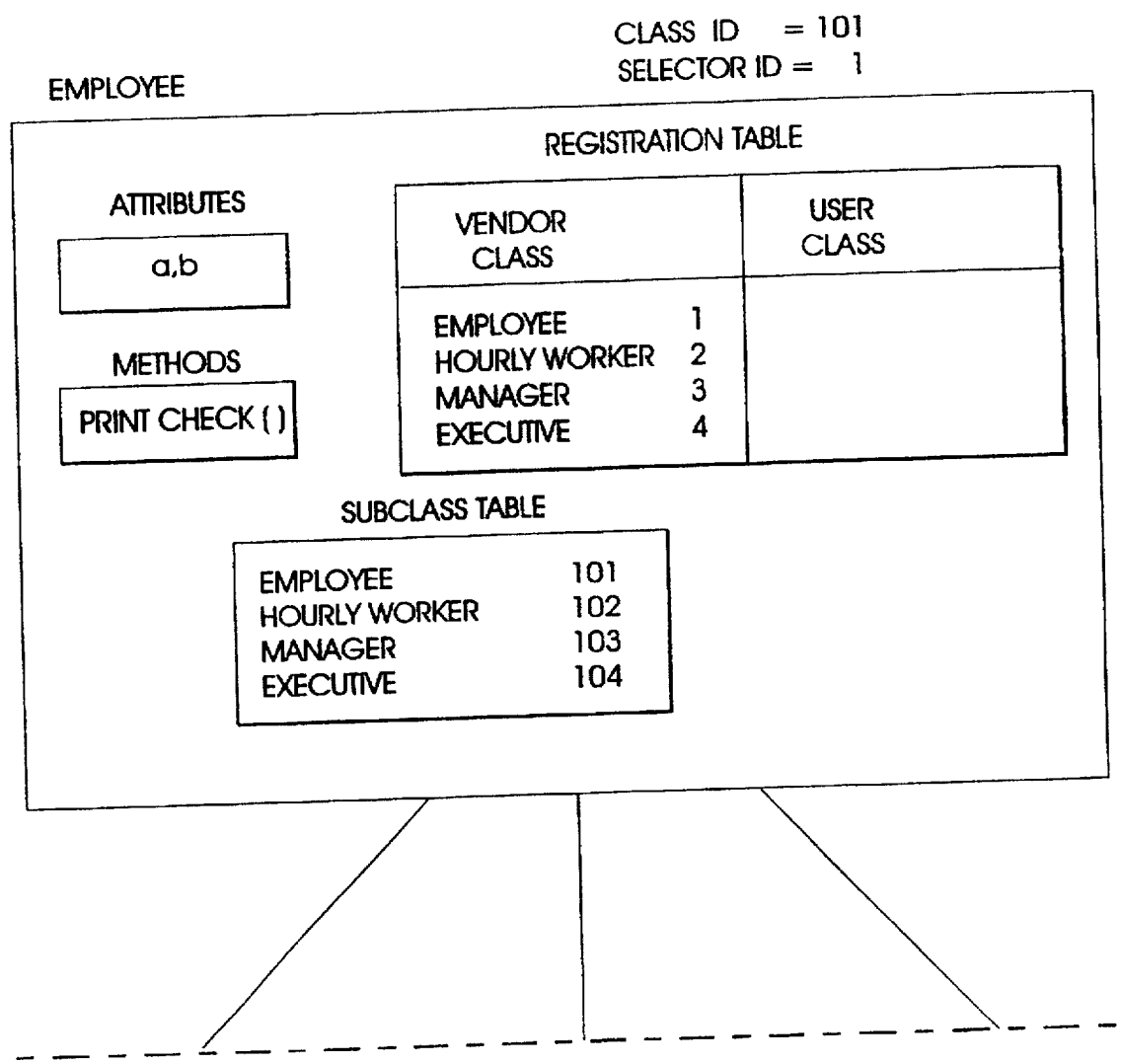

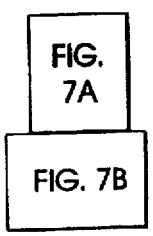
FIG. 7
FIG. 7A
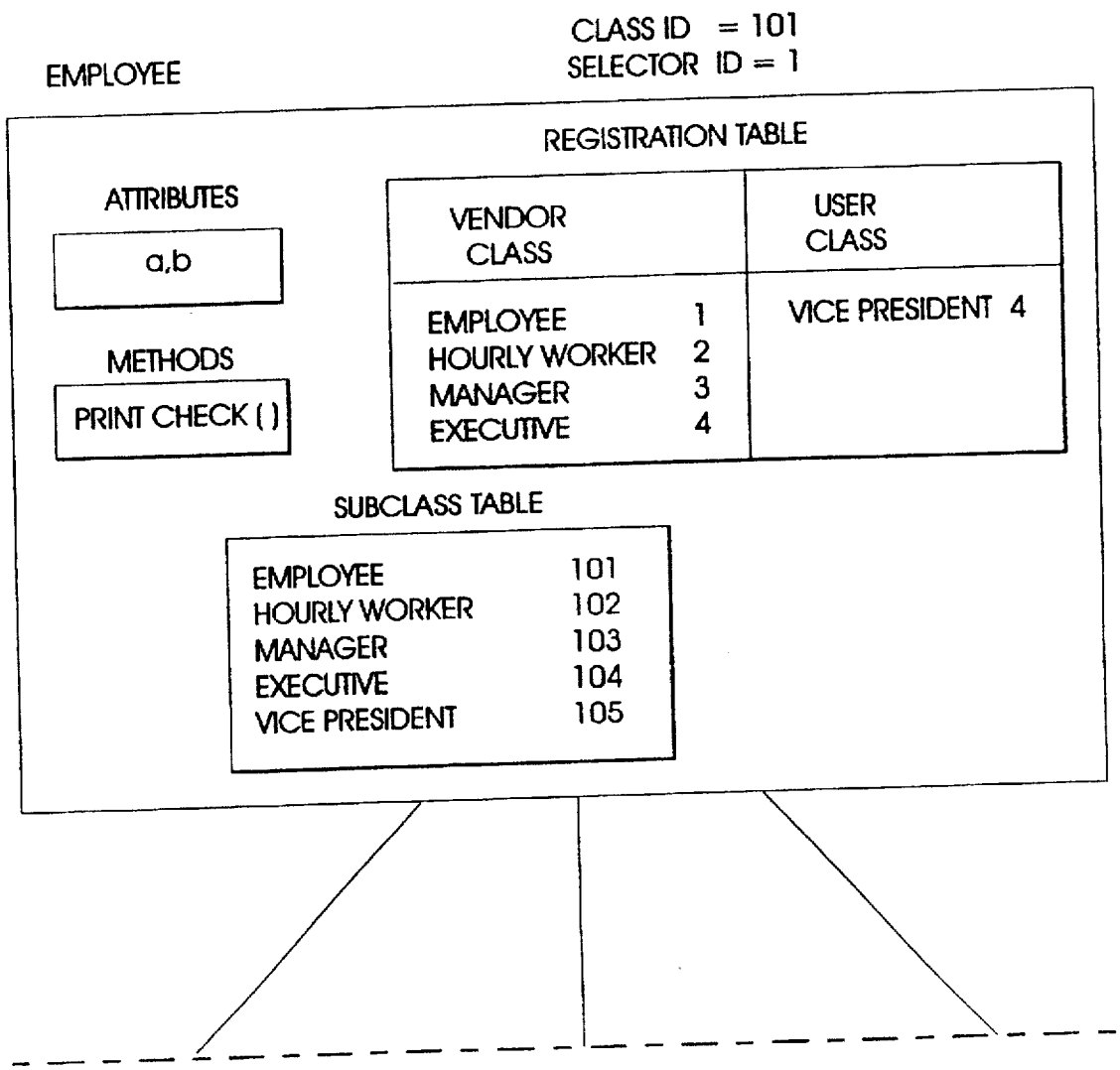

SYSTEMS, METHODS AND COMPUTER PROGRAM PRODUCTS FOR GENERATING AND VALIDATING USER DEFINED OBJECT CLASSES IN AN OBJECT ORIENTED PROGRAMMING ENVIRONMENT AFTER BUILD TIME

FIELD OF THE INVENTION

This invention relates generally to Object Oriented Programming Systems and methods, and more particularly to the creation and control of object classes and objects in an object oriented programming environment.

BACKGROUND OF THE INVENTION

In contrast with traditional procedural programming techniques which are not easily adaptable to new procedural requirements and new data types, object oriented programming is a computer programming packaging technique which provides reusable and easily expandable programs. In a traditional procedural program, emphasis is placed on methods to be conducted on particular data sets. By contrast, emphasis is placed on data in an object oriented program.

As is well known to those having skill in the art, object oriented programs are composed of various types of "objects". An object is a data structure, also referred to as a "frame", and a set of operations or functions, also referred to as "methods", for accessing and manipulating the data structure. Objects having identical data structures and common behavior can be grouped together into, and collectively identified as a "class." Objects are instances created from a particular class, and typically do not exist until run-time. Classes, however, are typically fixed at build-time. Each object inherits the data structure and methods of the particular class from which it was instantiated. A hierarchial inheritance relationship exists between multiple classes. For example, one class may be considered a "parent" of another class (the "child" of the parent class). The child class is said to be "derived" from the parent class and inherits all of the attributes and methods of the parent class.

Increasingly, users of vendor-supplied object oriented programs, referred to as hereinafter as "base programs", are demanding the ability to customize base programs to fit individual needs. Typically, object oriented programs permit users to create additional object classes from "exemplar" classes provided in the base program. Exemplar classes allow additional object classes to be derived after build-time. However, because these additional object classes are derived after build-time, the base program code, without modification, may not recognize the new object classes and may not be able to handle objects instantiated from them. This is because the base program is bound at build-time and typically requires integration of the user-created object classes and recompiling. Although user code may be able to access and manipulate objects created from these post-build-time classes, it would be desirable to enable the base program to access and manipulate these objects as if the program code had been recompiled.

Presently, program code reintegration and recompiling occurs one of two ways. Either software vendors must have access to the newly-created object classes, or users must have access to the vendor's base program code. Unfortunately, it is typically impractical and inefficient for a user to provide a vendor with a new object class for incorporation into a base program. From the user's standpoint, integration of the object class into the base program is time consuming, expensive, and rather inflexible. From the vendor's standpoint, if many users request integration of new object classes into the base program, the vendor will end up with many different versions of the base program. Future upgrades and modifications will be time consuming and expensive. Furthermore, it is undesirable to provide program code to users because of the risk that the program code will be copied and reused without the consent of the vendor.

SUMMARY OF THE INVENTION

It is therefore an object of the present invention to allow users to customize object oriented programs whereby new object classes can be created and utilized in conjunction with the base program without requiring modification to the base program.

It is another object of the present invention to provide the ability to support future maintenance and upgrades to the base program without requiring reintegration of object classes created by users.

It is yet another object of the present invention to provide users with the ability to instantiate and validate new objects generated from a new object class.

These and other objects are accomplished according to the present invention, by systems and methods for generating object classes after build-time, instantiating objects from these object classes, and validating called objects. In particular, the present invention generates a new object class, after build-time, in an object oriented computing environment on a computing platform including first and second object classes arranged in an inheritance hierarchy. The second object class is derived from the first object class, and both the first and second object classes are generated before build-time. Before build-time, the first and second object classes are provided with respective first and second selector identifiers. The first and second object classes are provided with respective first and second class identifiers. The first and second selector identifiers are registered along with respective first and second object class names in a first portion of a registration table linked to the first object class. The first and second class identifiers along with respective first and second object class names are registered in a first subclass table linked to the first object class. The second class identifier along with the second object class name is registered in a second subclass table linked to the second object class. The attributes and methods inherited from the second object class may be modified, and new attributes and methods may be added.

An object class is generated after build-time, according to the present invention, by deriving a third object class having a third subclass table from the second object class. The value of the second object class selector identifier is assigned to a third object class selector identifier. The assigned third object class selector value along with the third object class name is registered in a second portion of the first object class registration table. A unique class identifier is assigned to the third object class. The assigned unique class identifier along with the third object class name is registered in each one of the first, second, and third subclass tables.

An object is instantiated from an object class generated after build-time, according to the present invention, by transmitting, to the first object class, a request to instantiate an object from the third object class coupled with the value of the third object class selector identifier. The second portion of the first object class registration table is searched for the transmitted selector identifier value. An object is instantiated from the object class registered in the registration table having a selector identifier value matching the transmitted selector identifier value.

An object instantiated from an object class generated after build-time is validated, according to the present invention, by transmitting, to the third object class, the value of the class identifier of the third object class. The transmitted class identifier value and associated object class name is searched for in the subclass table of the third object class. The identified object class is requested to verify that its class identifier value matches the class identifier value of the object class requested.

According to another aspect of the present invention, a computer program product is provided to generate object classes after build-time, instantiate objects from these object classes, and validate called objects. A computer usable medium includes computer readable program code embodied in the medium for generating a new object class after build-time in an object oriented computing environment on a computing platform including first and second object classes arranged in an inheritance hierarchy. The second object class is derived from the first object class, and the first and second object classes are generated before build-time. Computer readable program code provides the first and second object classes with respective first and second selector identifiers; provides the first and second object classes with respective first and second class identifiers; registers the first and second selector identifiers along with respective first and second object class names in a first portion of a registration table linked to the first object class; registers the first and second class identifiers along with respective first and second object class names in a first subclass table linked to the first object class; and registers the second class identifier along with the second object class name in a second subclass table linked to the second object class. A computer program product, according to the present invention, further comprises computer readable program code for modifying attributes and methods inherited from the second object class, and for adding new attributes and methods.

A computer program product, according to the present invention, further comprises computer readable program code that derives a third object class having a third subclass table from the second object class; assigns the value of the second object class selector identifier to a third object class selector identifier; registers the assigned third object class selector value along with the third object class name in a second portion of the first object class registration table; assigns a unique class identifier to the third object class; and registers the assigned unique class identifier along with the third object class name in each one of the first, second, and third subclass tables.

A computer program product, according to the present invention, further comprises computer readable program code for instantiating an object from an object class generated after build-time. Computer readable program code: transmits, to the first object class, a request to instantiate an object from the third object class coupled with the value of the third object class selector identifier; searches the second portion of the first object class registration table for the transmitted selector identifier value; and instantiates an object from the object class registered in the registration table with a selector identifier value matching the transmitted selector identifier value.

A computer program product, according to the present invention, further comprises computer readable program code for validating an object instantiated from an object class created after build-time. Computer readable program code: transmits, to the third object class, the value of the class identifier of the third object class; searches for the transmitted value and associated object class name in the class identifier in the subclass table of the third object class; and requests the identified object class to verify that its class identifier value matches the class identifier value of the object class requested.

The present invention is advantageous because the base program code need not be modified to allow users to generate new object classes and objects. Because user-created object classes are called before vendor provided object classes having the same selector identifiers, it is not necessary to recompile the program code to enable the program code to properly handle objects instantiated from object classes generated after build-time. As a result, users obtain a significant degree of flexibility and vendors are not forced into maintaining multiple versions of a base program. Furthermore, vendor-provided updates to the exemplary object classes will not overwrite the user-created object classes. In addition, the present invention avoids system crashes by providing the ability to validate object requests.

BRIEF DESCRIPTION OF THE DRAWINGS

FIG. 3 consists of FIGS. 3A, 3B, 3C, and 3D.

FIG. 6 consists of FIGS. 6A and 6B.

FIG. 7 consists of FIGS. 7A and FIGS. 8–12 are flow charts illustrating pre-build-time programming, run-time user object class generation, run-time user object instantiation, and run-time user object validation, according to the present invention.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
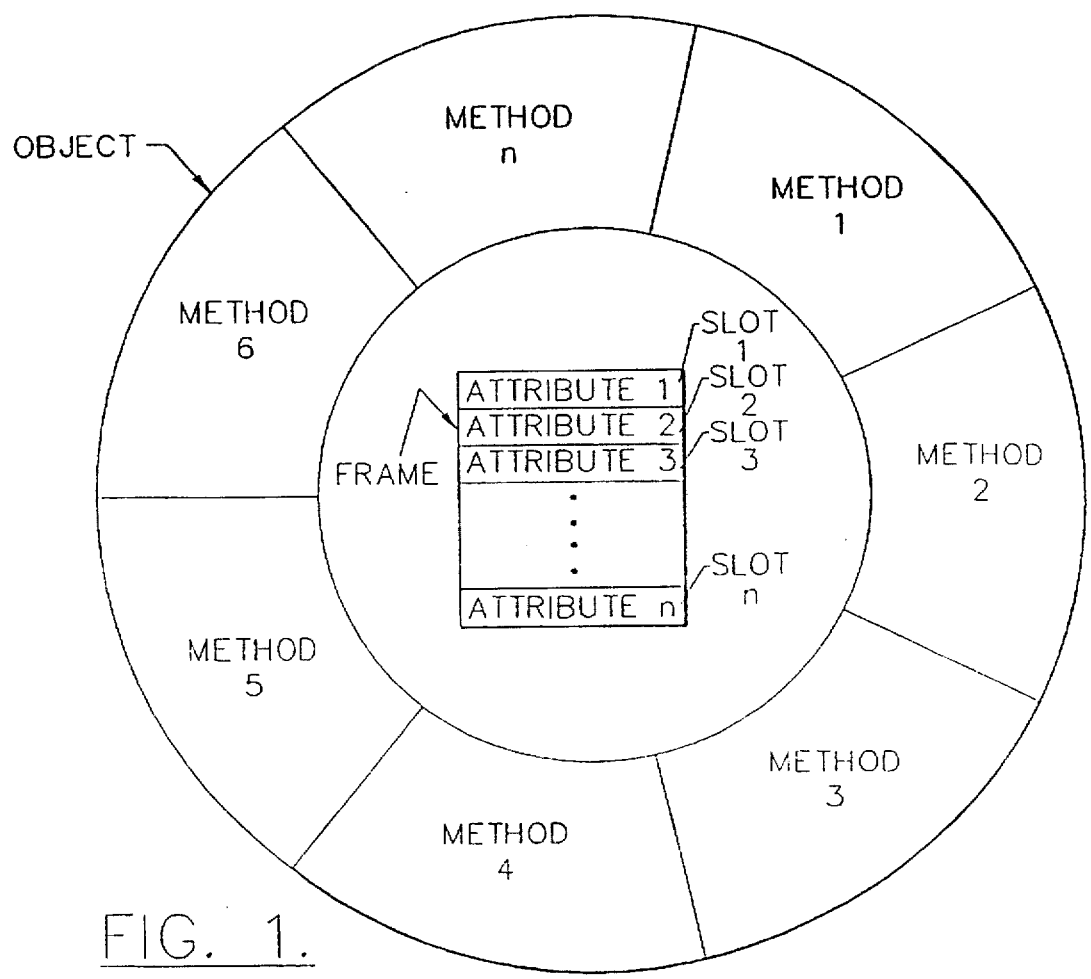
FIG. 1 schematically illustrates an object.

FIG. 1 schematically illustrates an object comprising a data structure and a set of methods for accessing the data structure. The data structure is represented as a frame comprised of many slots, wherein each slot contains an attribute of the object. An attribute may be a primitive, i.e., an integer or a string, or a pointer to another object. A pointer is basically a memory address of a particular object or class. As illustrated, the frame of an object is "encapsulated" by its methods.

The blueprint from which every object is created is known as a class. All the attributes and methods for an object are specified in the class from which the object is created. Every object is referred to as an "instance" of its class. A hierarchial relationship typically exists among object classes. A parent object class often has child classes, or subclasses, related to it. An object subclass inherits all of the data characteristics and methods of its parent object class. In addition, some object oriented programs may permit the addition of attributes and methods to child classes.

Figure 2:
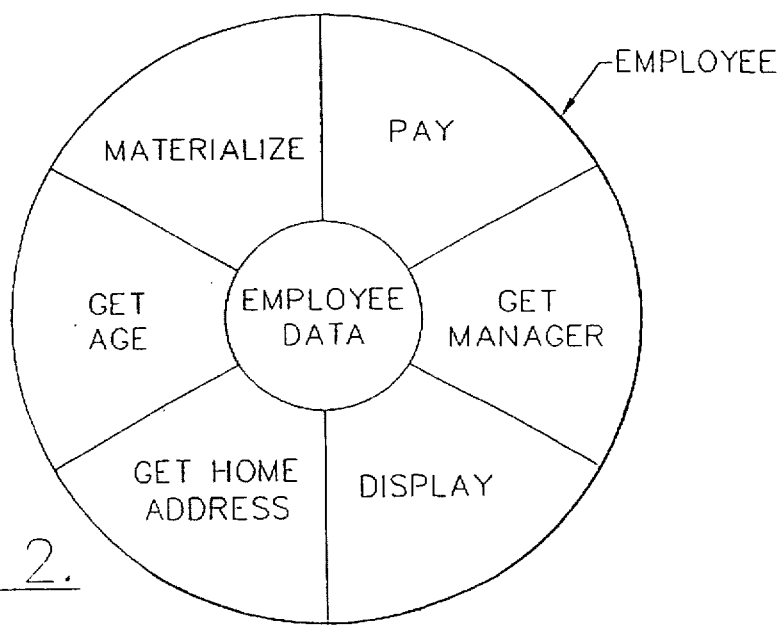
FIG. 2 schematically illustrates an example of an object.

FIG. 2 is a schematic illustration of an object class defined as "EMPLOYEE" wherein the data structure relates to employee data, and a number of methods encapsulate the data structure. Each instance, or object, created from this class inherits the particular data structure and encapsulating methods.

Figure 3:
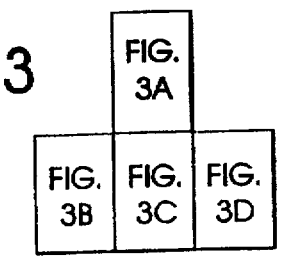
FIG. 3 schematically illustrates an example of an inheritance hierarchy in an object oriented computing system.
Figure 3A:
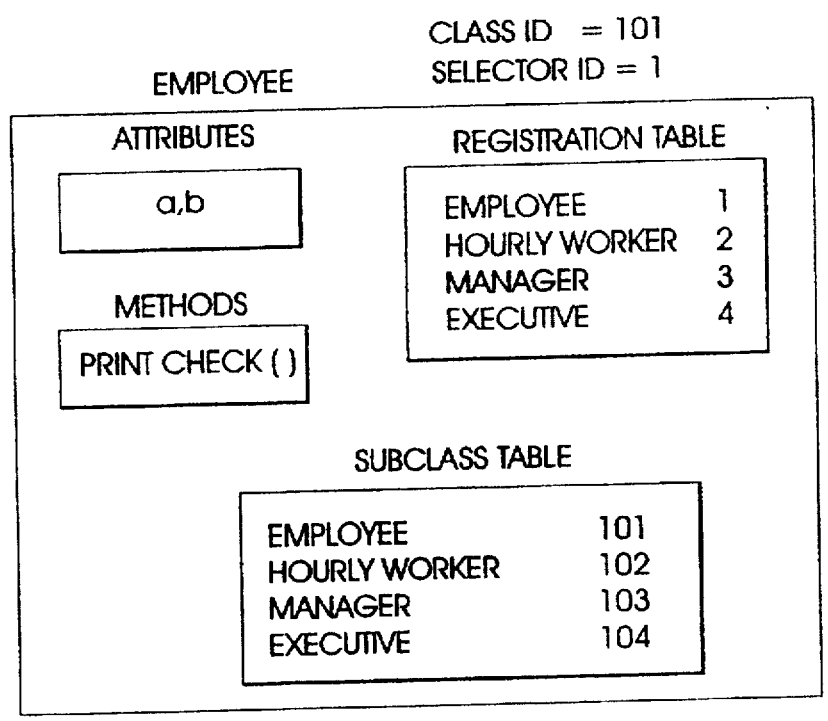
Figure 3B:
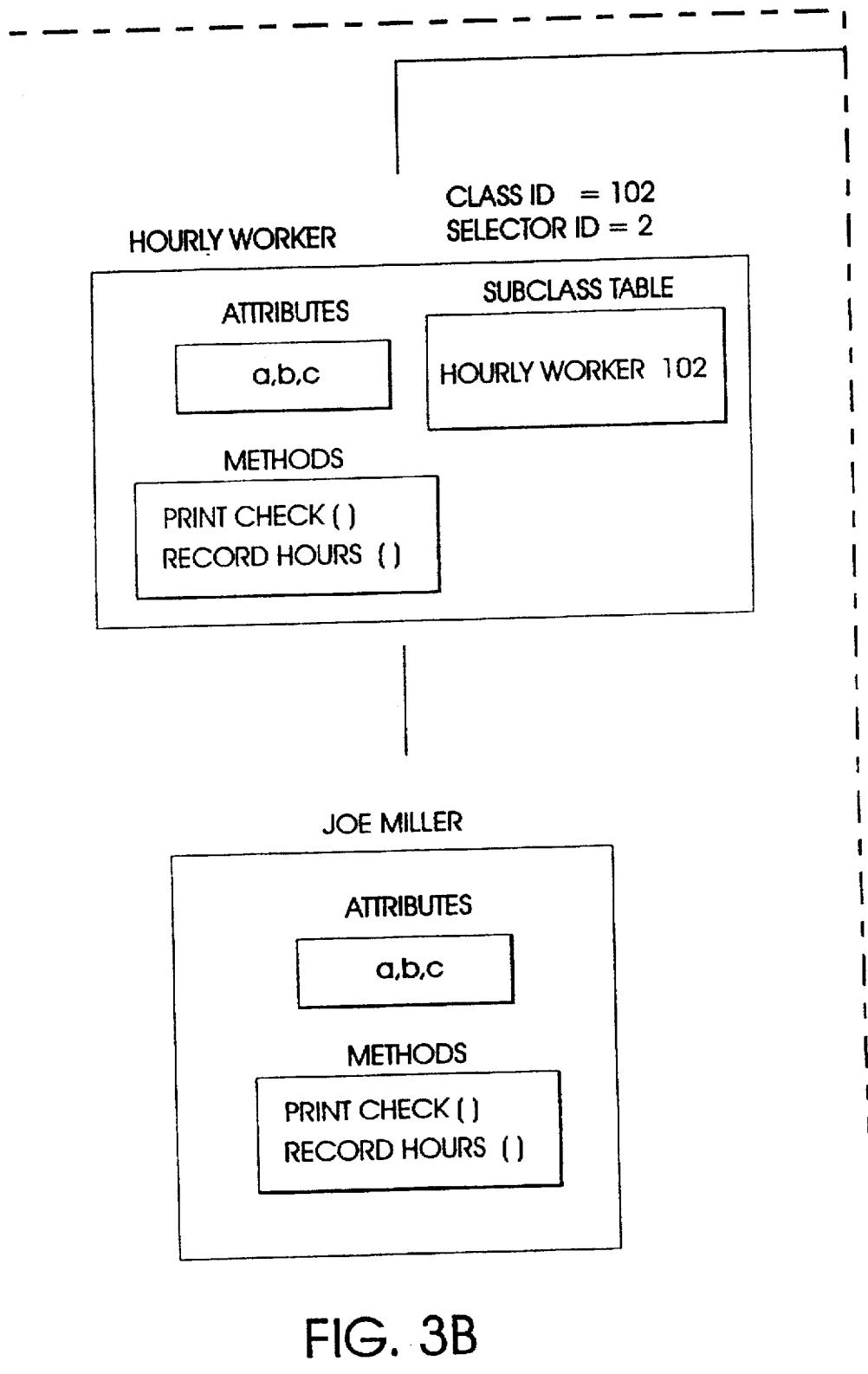
Figure 3C:
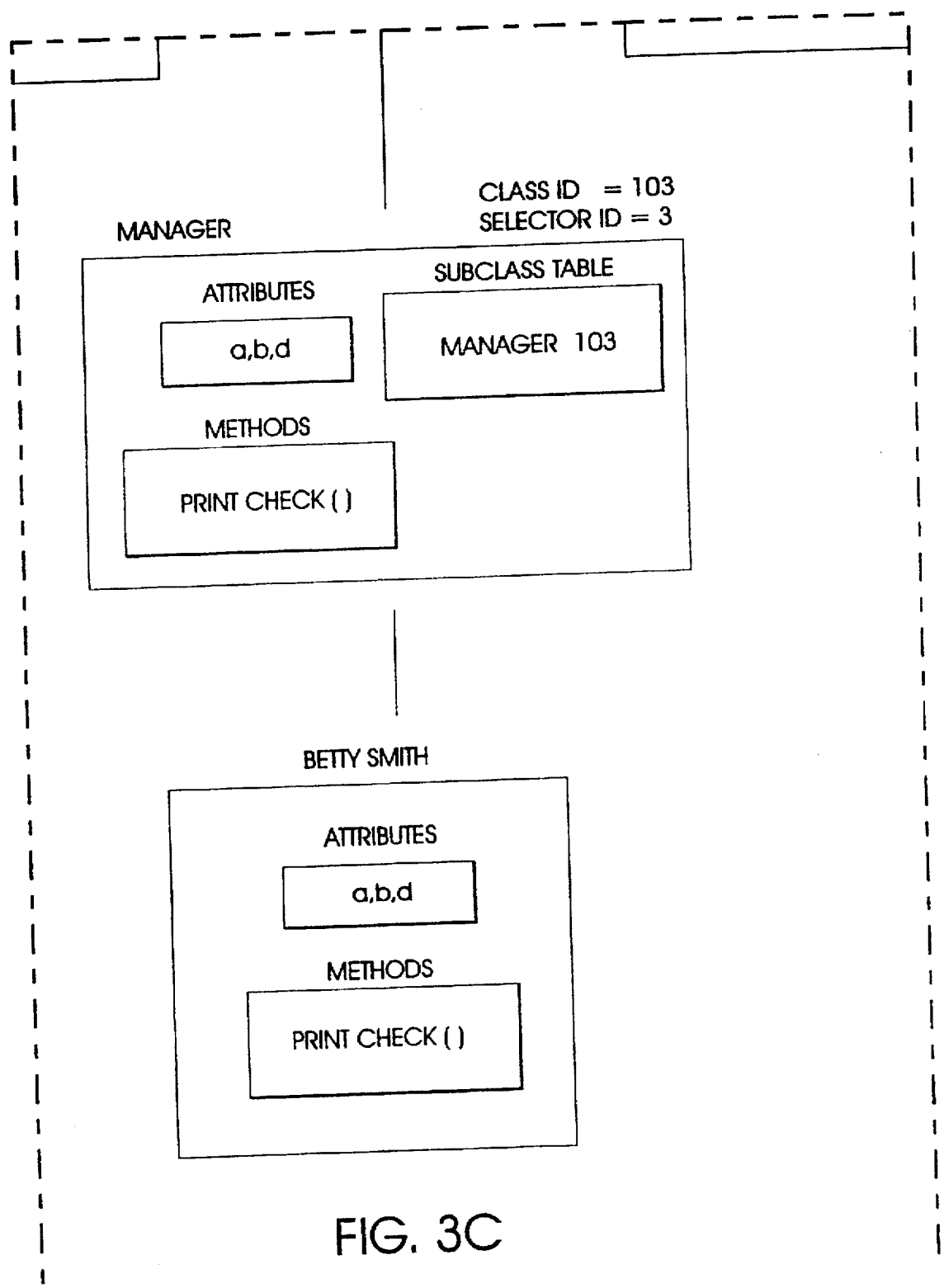
Figure 3D:
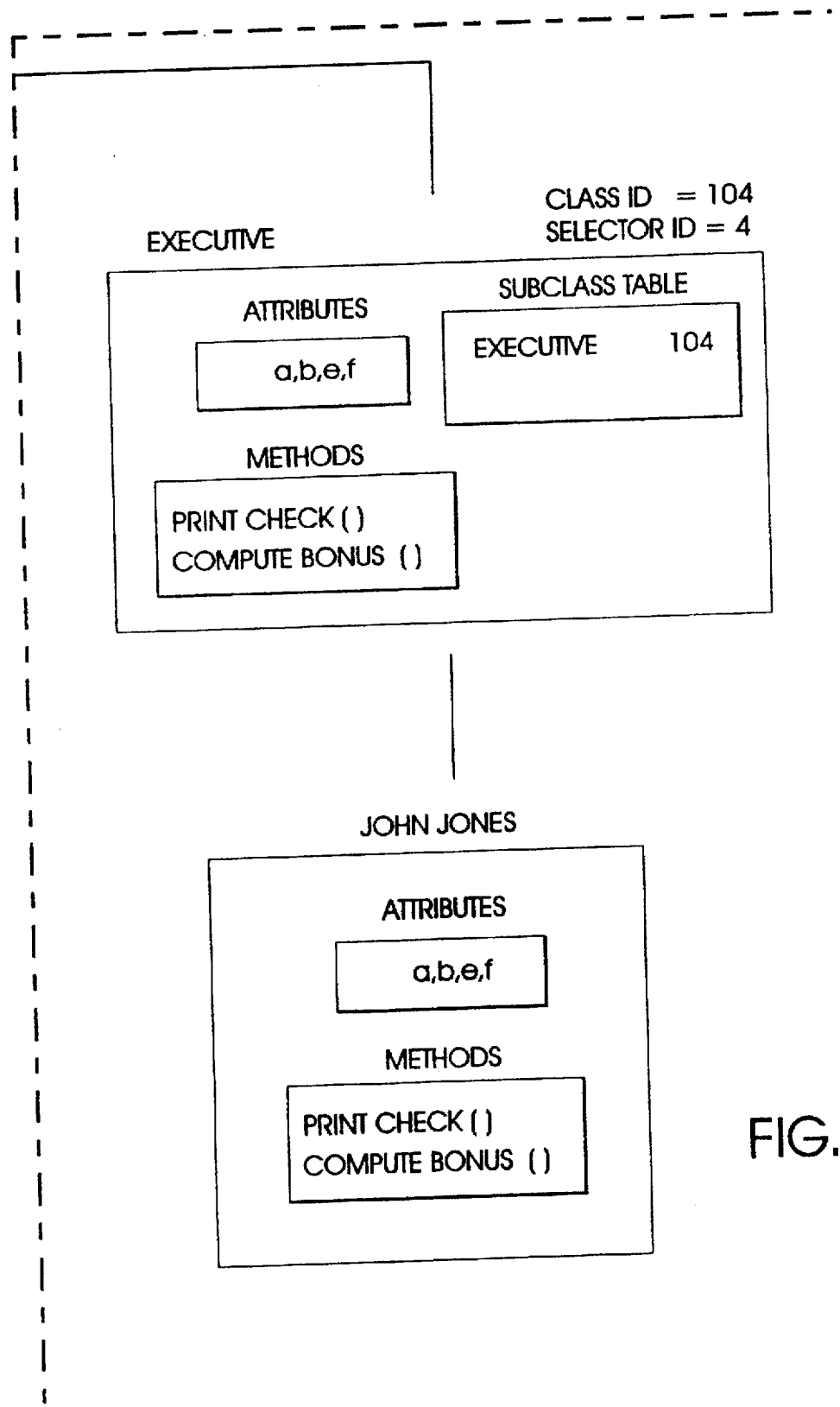

FIG. 3 schematically illustrates the inheritance hierarchy among four object classes: "EMPLOYEE", "EXECUTIVE", "MANAGER" and "HOURLY WORKER". The classes "EXECUTIVE", "MANAGER", and "HOURLY WORKER" are each subclasses of the parent class "EMPLOYEE". Each subclass includes an instance for illustrative purposes: "JOE MILLER" is an instance of "HOURLY WORKER"; "BETTY SMITH" is an instance of "MANAGER"; and "JOHN JONES" is an instance of "EXECUTIVE". Each subclass inherits the data structure and methods of the parent class "EMPLOYEE". As shown, attributes and methods can be added to each subclass. "HOURLY WORKER" and "EXECUTIVE" have each added an additional method, and each one of the subclasses has added at least one attribute. As will be described in detail below, the present invention assigns class identifiers and selector identifiers to each object class. Each class contains a subclass table, and the parent class also contains a registration table, as illustrated.

Figure 4:
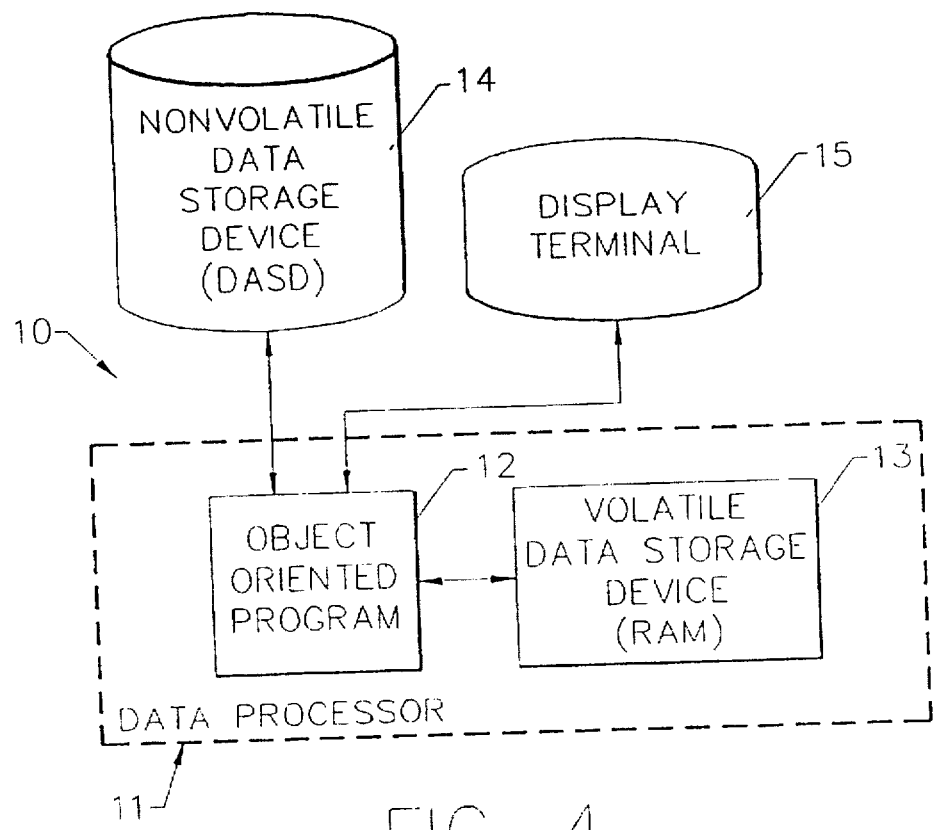
FIG. 4 schematically illustrates a hardware and software environment in which the present invention operates.

Referring now to FIG. 4, a hardware and software environment in which the present invention operates will now be described. The present invention allows for the creation and control of object classes and objects within an object oriented computing environment 11 operating on one or more computer platforms 12. It will be understood by those having skill in the art that a computer platform 12 typically includes computer hardware units 13 such as a central processing unit (CPU) 14, a main memory 15 and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system 28.

As shown in FIG. 4, an object oriented computing environment 11 operates on computer platform 12. For example, each computer platform 12 may be a computer having an IBM System 370 architecture. However, it will be understood by those having skill in the art that an object oriented computing environment 11 may operate across multiple computer platforms. The operating system 28 may be an IBM multiple virtual storage (MVS) system. An object oriented computing environment 11 is typically written in an object oriented dialect of the C computer programming language, such as C++, or in conventional programming languages such as FORTRAN or COBOL.

The design and operation of computer platforms and object oriented computing programs, including that of an object manager, are well known to those having skill in the art and are described, for example in U.S. Pat. No. 5,161,225 to Abraham et al. entitled *Persistent Stream for Processing Time Consuming and Reusable Queries in an Object Oriented Database Management System*; U.S. Pat. No. 5,151,987 to Abraham et al. entitled *Recovery Objects in an Object Oriented Computing Environment*; and U.S. Pat. No. 5,161,223 to Abraham entitled *Resumeable Batch Query for Processing Time Consuming Queries in an Object Oriented Database Management System*, all assigned to the assignee of the present invention, the disclosures of which are hereby incorporated herein by reference, and in numerous textbooks such as *Object Oriented Software Construction* by Bertrand Meyer, published by Prentice Hall in 1988, the disclosure of which is incorporated herein by reference.

Figure 5:
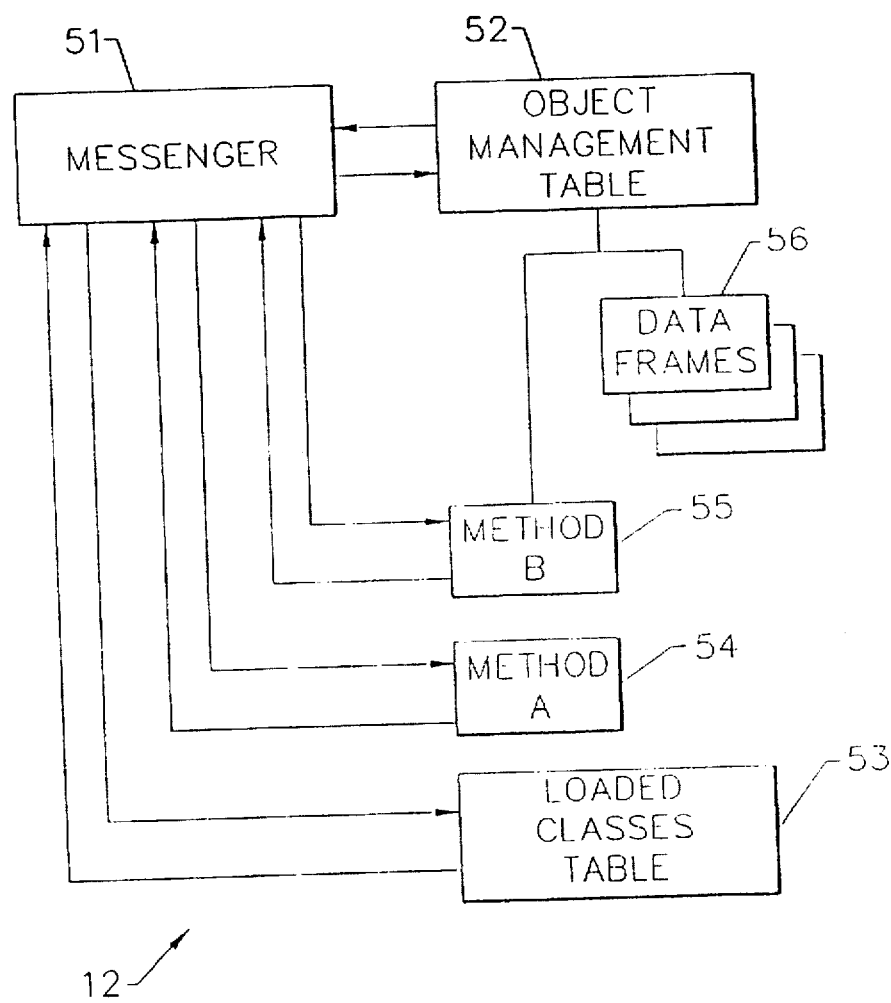
Fig. 5 schematically illustrates the main components of an object oriented computing system.

Referring now to FIG. 5, the main components of an object oriented environment 11 will be described. An object oriented computing environment 11 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of an object oriented environment 11 will now be described for the example illustrated in FIG. 5, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching the Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

The Exemplar Idiom

It is often the case that object class hierarchies, as well as the behavior of object classes themselves, evolve over the lifetime of a program. Many systems within which object oriented programs run are not conducive to the implementation of program changes after program code build-time. Traditionally, to modify or add an object class, the base program code had to be recompiled after object class changes or additions were made to the base program. An object oriented programming technique that permits object class change and manipulation without requiring program code recompiling, is known as the "exemplar idiom." See Chapter 8 of Advanced C++ *Programming Styles and Idioms*, by James O. Coplien, Addison-Wesley Publishing Company, 1992, which is incorporated herein by reference in its entirety.

Using the exemplar idiom, users can take a vendor-supplied object oriented program having an exemplar object class (an object class from which all subclasses are derived) and add new subclasses or modify existing subclasses without the necessity of modifying and recompiling the base program code. In general terms, the exemplar idiom gives object classes the characteristics of objects themselves, thereby permitting the base program to create and modify object classes at run-time rather than at build-time. However, when object classes are modified or replaced, the base program needs some method of recognizing and validating instances created from these object classes. The base program will not be aware of objects created from object classes modified or added after build-time. The present invention provides a solution to the problems presented by object classes generated after build-time.

Figure 6B:
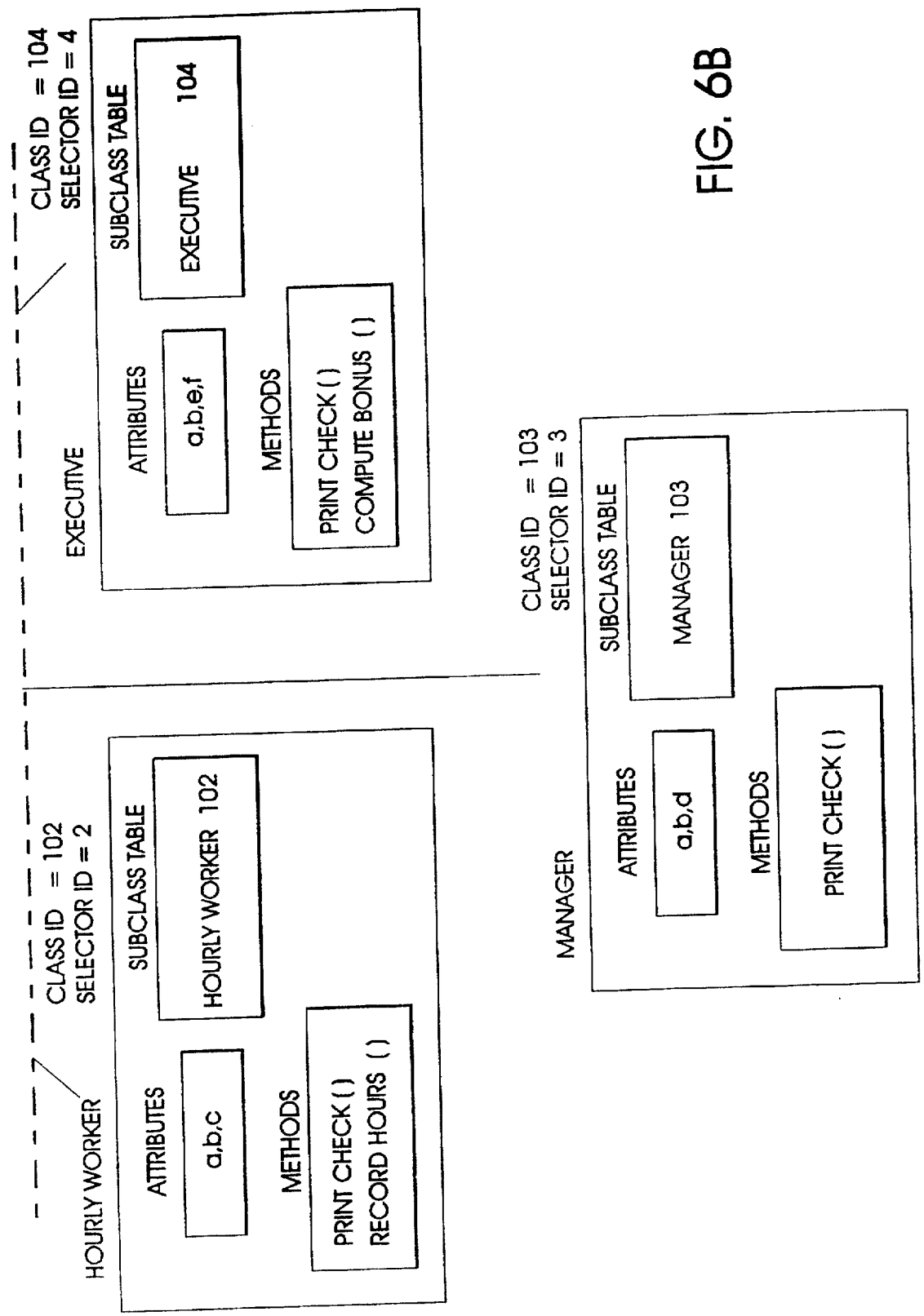
FIG. 6 schematically illustrates an object class hierarchy at build-time, according to the present invention.

Referring now to FIG. 6, an object class hierarchy of a base program incorporating the present invention is illustrated. The exemplary base class "EMPLOYEE" includes three subclasses: "HOURLY WORKER", "MANAGER", and "EXECUTIVE". Each one of these subclasses inherits attributes and methods from the base class "EMPLOYEE." At build-time, each class is also assigned a class identifier (class ID) and a selector identifier (selector ID). Each class ID is unique, so that no other class, even among hierarchies within the object oriented program, has the same ID. Each selector ID is unique within the hierarchy only. For example, if multiple hierarchies exist within a program, it is possible that a particular selector ID may be used in each of the hierarchies. However, a particular class ID will never be used more than once within the program.

As shown in FIG. 6, the exemplary object class "EMPLOYEE" also includes a registration table composed of two portions: a vendor class portion and a user class portion. The name of each one of the object classes existing at build-time are included in the vendor class portion of the registration table along with its respective selector ID. In addition, each one of the object classes includes a subclass table. The name of each one of the object classes are included, along with its respective class ID, in its respective subclass table and the subclass tables of all classes above it in the hierarchy. For example, the subclass table within the exemplary class "EMPLOYEE" contains the class ID for itself and each one of the subclasses beneath it in the illustrated hierarchy. The subclass table within the subclass "HOURLY WORKER", for example, includes only the class ID for itself, because there are no subclasses beneath it in the hierarchy.

Figure 7B:
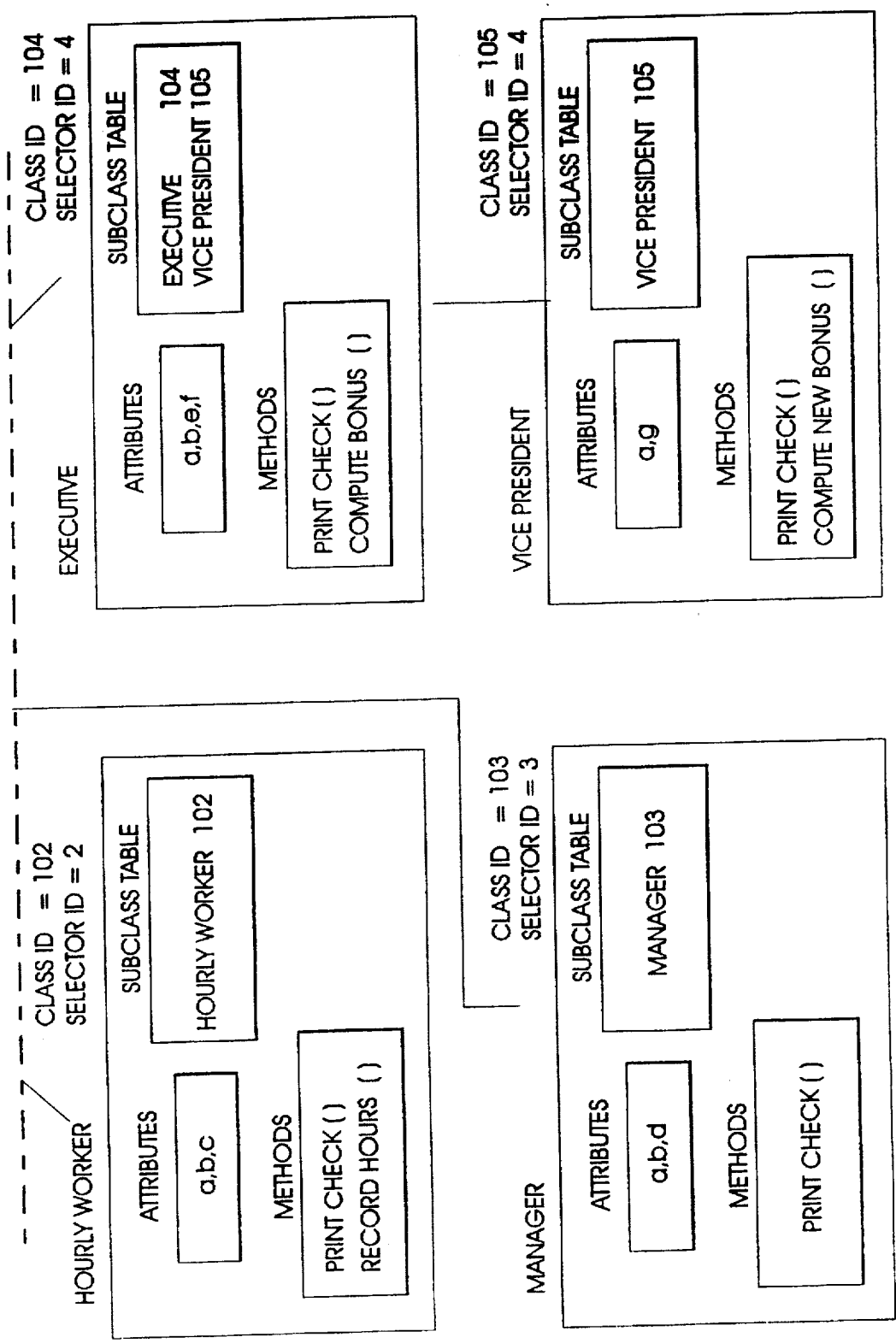
FIG. 7 schematically illustrates an object class hierarchy at run-time, according to the present invention.

Referring now to FIG. 7, the addition of a new object class after build-time, according to the present invention, is illustrated. A new subclass "VICE PRESIDENT" has been added as a subclass of the subclass "EXECUTIVE." "VICE PRESIDENT" is assigned a selector ID and a class ID, and the class ID is included within a subclass table therein. Although "VICE PRESIDENT" initially inherited the attributes and methods of "EXECUTIVE", as shown in FIG. 7, "VICE PRESIDENT" now includes only one attribute and no methods from "EXECUTIVE." The method "COMPUTE NEW BONUS" encapsulating the attributes of "VICE PRESIDENT" is a method not found anywhere in the hierarchy.

The selector ID assigned to "VICE PRESIDENT" is the same as the selector ID assigned to "EXECUTIVE." The name of the new subclass and its selector ID have been included within the user class portion of the registration table within the exemplary object class "EMPLOYEE." In addition, the class ID for "VICE PRESIDENT" has been included in the subclass table of each of the classes above it in the hierarchy.

Figure 8:
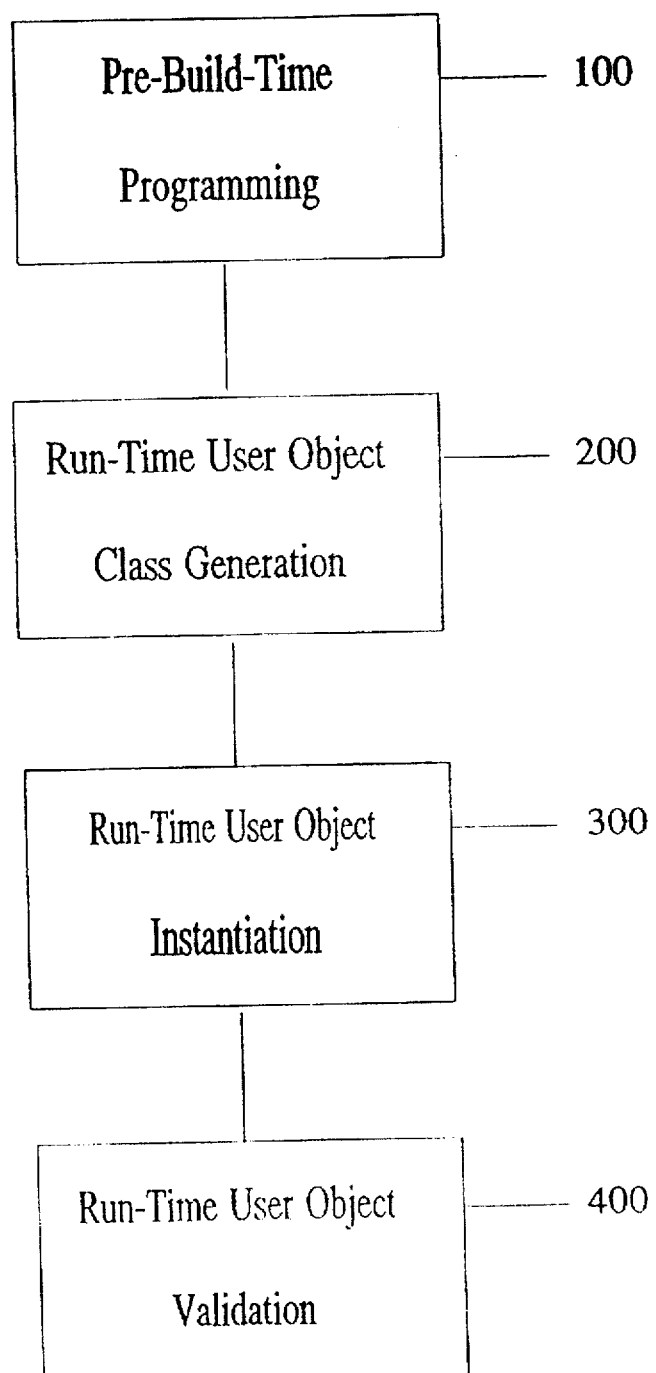

Referring now to FIGS. 8–12, the creation and control of new object classes and objects instantiated therefrom, according to the present invention, will be described in greater detail. The present invention comprises pre-build-time programming (block 100), run-time user object class generation (block 200), run-time user object instantiation (block 300), and run-time user object validation (block 400) (FIG. 8).

Figure 9:
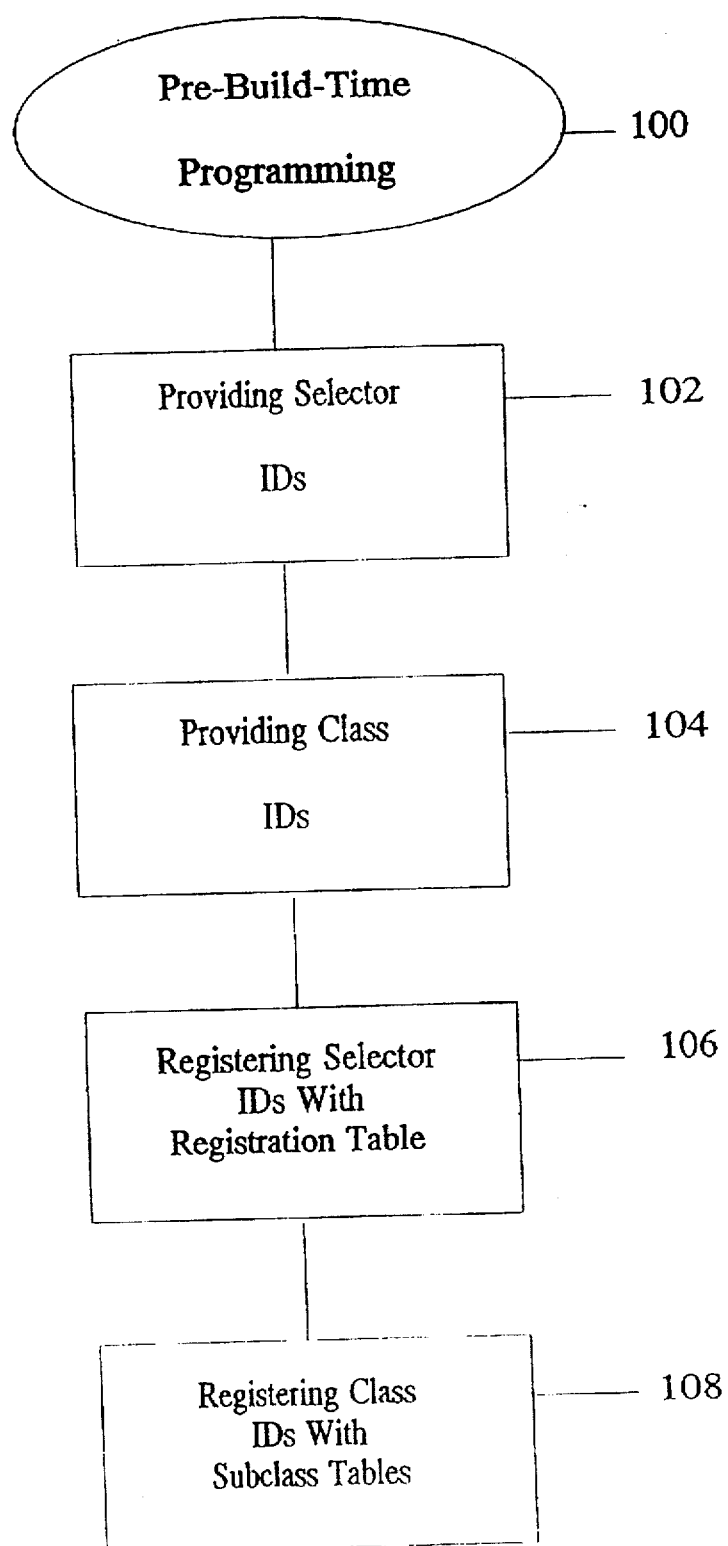

Referring now to FIG. 9, pre-build-time programming (block 100) comprises providing selector IDs (block 102), providing class IDs (block 104), registering the selector IDs with the registration table (block 106), and registering class IDs with the subclass tables (block 108). Referring back to FIG. 6, a vendor-provided base program will comprise one or more object class hierarchies. Prior to building the program (compiling the program code, each object class will have been defined with respect to its attributes and methods, and will have been assigned a respective selector ID and class ID. A registration table within the exemplary class will comprise a list of the names and selector IDs of all subclasses beneath the exemplary class. A subclass table within each one of the classes will contain the name and class ID of itself and all classes beneath it in the hierarchy.

Figure 10:
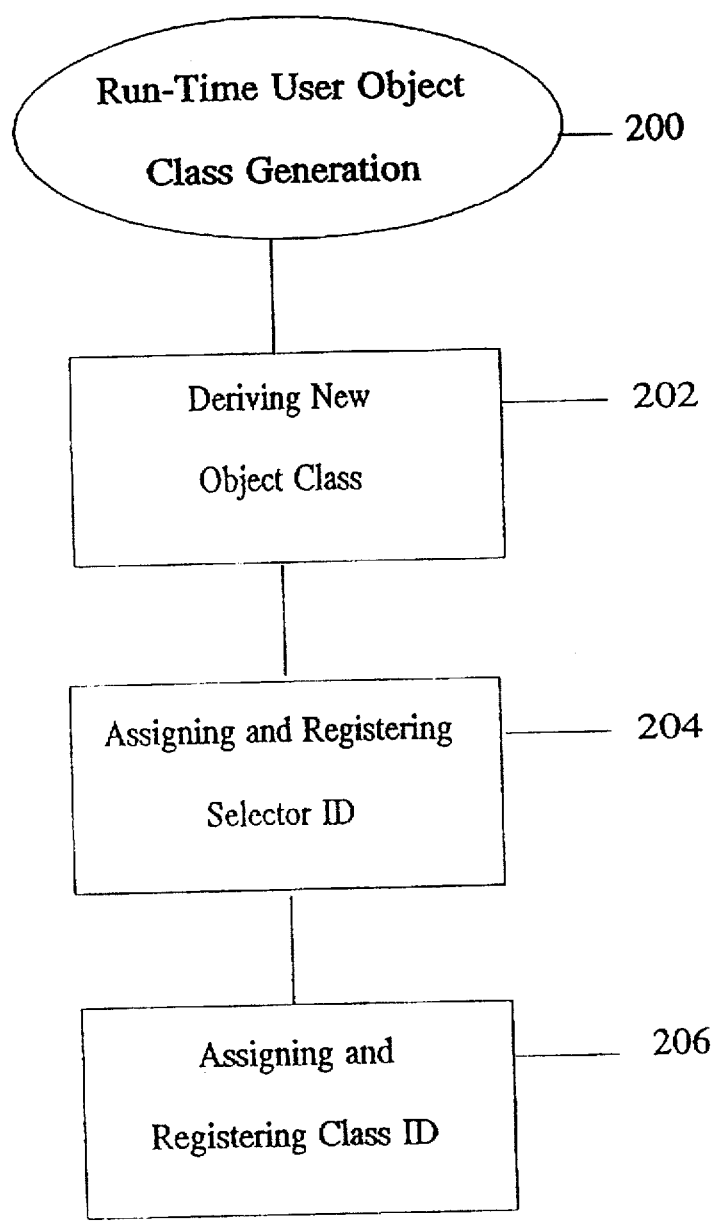

Referring now to FIG. 10, run-time user object class generation (block 200) comprises deriving a new object class (block 202), assigning and registering a selector ID (block 204), and assigning and registering a class ID (block 206). Referring back to FIG. 7, run-time user object class generation (block 200) is illustrated by the new subclass "VICE PRESIDENT." In the illustrated embodiment, a user has decided to customize the base program by creating a new object class "VICE PRESIDENT" as a subclass of the vendor-provided class "EMPLOYEE", and as a replacement for the vendor-provided subclass "EXECUTIVE."

Initially, the new class is derived from existing subclass "EXECUTIVE" (block 202). The attributes and methods of "EXECUTIVE" are inherited by "VICE PRESIDENT" and a subclass table is linked therewithin. The selector ID (4 in the illustrated embodiment) of "EXECUTIVE" is assigned to "VICE PRESIDENT" and registered in the user class portion of the registration table within the exemplary class "EMPLOYEE" (block 204). As is discussed in more detail below, by assigning the selector ID of a replaced vendor-provided class to a user-created class, an object oriented program is able to recognize and handle new object classes as if the program code had been modified prior to build-time. The new class is assigned a unique class ID which is then registered (block 206) in the subclass table of the new object class and the subclass tables of all classes above it. As shown in FIG. 7, "VICE PRESIDENT" has been assigned a class ID of 105, and it is registered within the respective subclass tables of "EMPLOYEE", "EXECUTIVE", and "VICE PRESIDENT."

Figure 11:
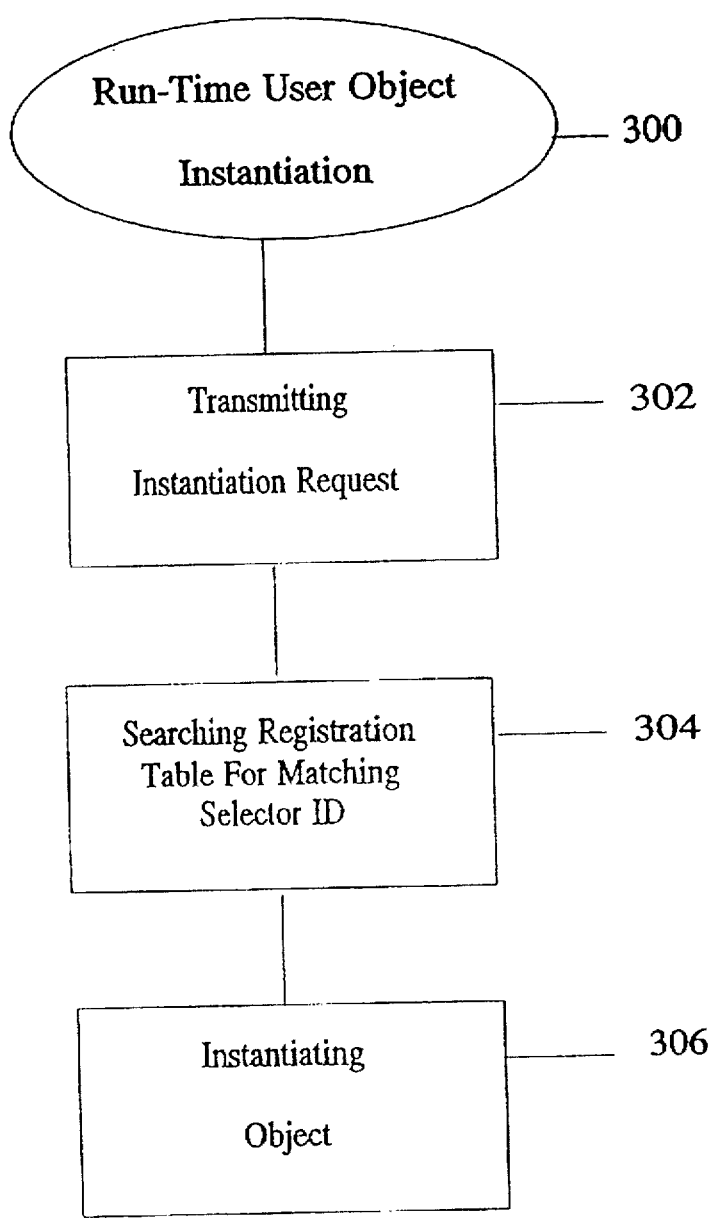

Referring now to FIG. 11, run-time user object instantiation (block 300) comprises the steps of transmitting an instantiation request (block 302), searching the registration table for a matching selector ID (block 304), and instantiating an object (block 306). In a typical object oriented program, the subclasses of a parent class are known at build-time, and a request to instantiate an object from a subclass is understood by the base program. Object classes created after build-time cannot replace the behavior of object classes existing at build-time. According to the present invention, the base program is able to instantiate objects from classes it is not aware of via the registration table which retains the selector IDs for every subclass derived from the exemplar class. All vendor-provided classes, existing at build-time are registered in the vendor class portion of the table. All classes generated after build-time are registered in the user class portion of the table. Upon receiving an instantiation request from a user (block 302), the exemplar class scans the registration table, beginning with the user class portion, looking for a selector ID matching the request (block 304). When a matching selector ID is found, an object is instantiated from the object class having the same name as that linked to the found selector ID (block 306). Consequently, the exemplar class need not know that the requested object class exists. As long as an object class name and a corresponding selector ID is registered with the registration table, the base program can properly handle the instantiation of objects from unknown object classes.

The user class portion of the registration table is always scanned first, thereby ensuring that user-created object classes are called before vendor-provided object classes. For example, assume a user requests an object instantiated from object class "HOURLY WORKER" (FIG. 7). The user class portion of the registration table is scanned for a selector ID having the value of "2" Because no selector ID in the user class portion has the value "2", the vendor class portion of the registration table is then scanned. Since a selector ID having the value "2" exists in the vendor class portion of the registration table, the base program would proceed with instantiating an object from the "HOURLY WORKER" object class.

Assume that a user is not satisfied with the method of computing bonuses, "COMPUTE BONUS," included within the vendor-provided object class "EXECUTIVE." The user decides to generate a new object class entitled "VICE PRESIDENT" comprising a completely different method of calculating the yearly bonus. By registering "VICE PRESIDENT" in the user class portion of the registration table with the same selector ID as "EXECUTIVE," any base program code or user code that attempts to instantiate an "EXECUTIVE" object, will instantiate a "VICE PRESIDENT" object. Any requests to perform "COMPUTE BONUS" on an object will automatically call the new method "COMPUTE NEW BONUS." The base program will recognize only the first selector ID having the value transmitted in an instantiation request (block 302). All other object classes registered with the registration table with the same selector ID will be ignored. As a result, user-created object classes obtain control prior to any vendor-provided object classes having the same selector ID.

Figure 12:
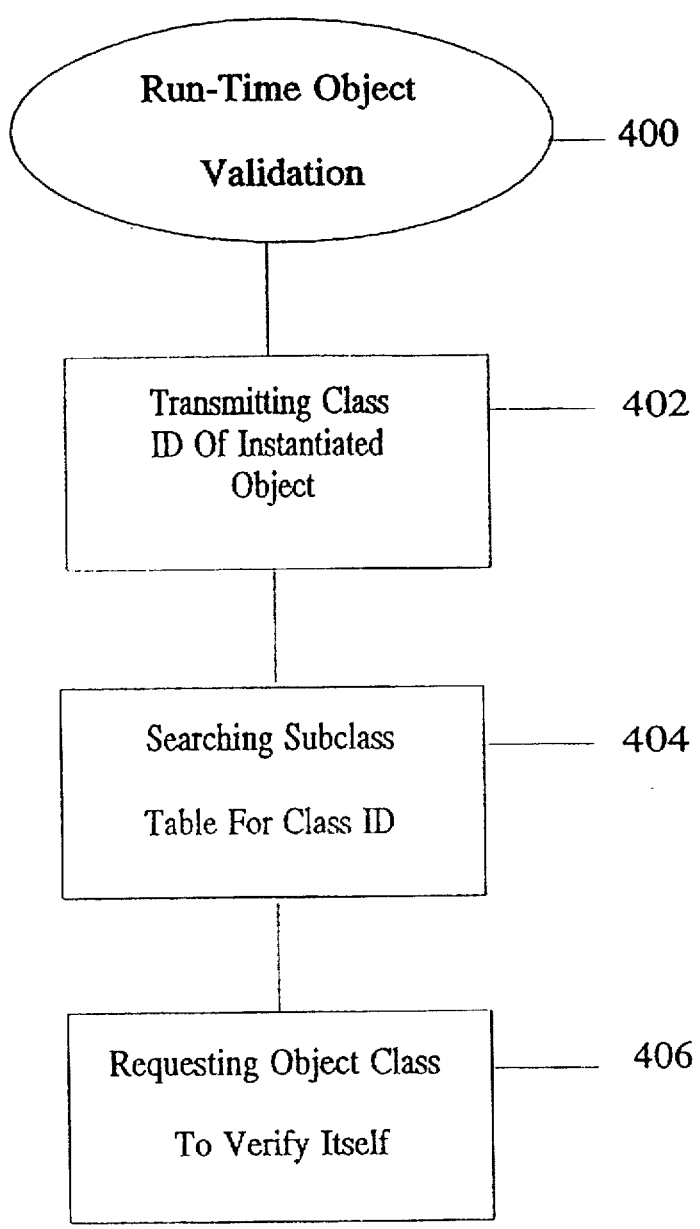

Because the present invention allows user-created object classes to effectively replace vendor-provided object classes without modification to the program code, there is a possibility that objects instantiated from object classes will not recognize other objects and vice-versa. The present invention provides a mechanism for validating objects instantiated by user-created object classes. Referring now to FIG. 12, run-time user object validation (block 400) comprises transmitting the class ID of the instantiated object (block 402), searching the object class subclass table for the transmitted class ID (block 404), and requesting the identified object class to verify itself (block 406).

When a user requests the base program to create an object, the class ID of the target object is transmitted to the exemplary class (block 402). The exemplary class searches its subclass table to see if the requested object class ID is registered (block 404). If the class ID is found in the exemplary class subclass table, a pointer is passed to the object class having the name registered with the class ID, and the object class is requested to verify that it is the correct object class (block 406). The program proceeds if the object class is valid, and terminates or returns an error message if not valid.

For example, referring to FIG. 7, assume a user desires to create an object "BILL SMITH" (not shown) from the user-created object class "VICE PRESIDENT" and compute the yearly bonus for "BILL SMITH" using the method "COMPUTE NEW BONUS." The class ID "105" of "VICE PRESIDENT" would be transmitted to the exemplary class with the request to create the object. The exemplary class "EMPLOYEE" would search its subclass table for a class ID having the value "105." Once found, the exemplary class would pass a pointer to the named class registered with the class ID "105" and request it to verify that it is the requested object class. If verified, the object is created. After the object is created, the new method "COMPUTE NEW BONUS" can be performed. If the object is not created, the method is not performed on the object "BILL SMITH" and an error message is returned.

The following is pseudo-code related to an implementation of the present invention.

```
// :H1 U01WORB2.HPP: START OF SPECIFICATIONS
//----------------------------------------------------------------
//
// Module Name: U01WORB2.HPP
//
// Description: This module defines the behavior of the u01fWorkStation1 class.
//
//    (C) Copyright IBM Corp. 1993
```

-20-

```
//    All rights reserved.
//
// Function: This module defines the behavior of the u01WorkStation1 class.
//           This is an example of how to use exemplars.
//
//
// Notes: None.
//
// Change Activity ------------------------------------------------
// END-OF-SPECIFICATIONS ------------------------------------------- ifndef U01WORB2_HPP
define U01WORB2_HPP include "fworksb3.hpp"

enum
  {FST_CLASS_u01WorkStation1 = FST_END_SS + FST_CLASSID};

// :H2 U01WorkStation1: Create new workstation
//-----------------------------------------------------------------
//
// This class defines a new type of workstation.
//
//-----------------------------------------------------------------
class u01WorkStation1 : public fWorkStation1
  {FST_CLASS_DECS(u01WorkStation1) public:
     // :H2 CONSTRUCTORS: Create new workstation objects
     //-----------------------------------------------------------
     // make: This method examines the value of the selector and determines
     //       if an object of his class should be made. If so, it makes an
     //       object and returns. If not, it returns NULL.
     //    INPUT  : WORKSTATIONSELECTOR - object type to create
     //             VOID * - additional parameters
     //    OUTPUT : return - fWorkStation *
     //    EXAMPLE: fWorkStation* client1 = workStationExemplar->make(client);
     //    NOTES  : None
     //
     // make: This method examines the value of the selector and determines
     //       if an object of his class should be made. If so, it makes an
     //       object and returns. If not, it returns NULL.
     //    INPUT  : WORKSTATIONSELECTOR - object type to create
     //             LONG - dummy parameter
     //             VOID * - additional parameters
     //    OUTPUT : return - fWorkStation *
     //    EXAMPLE: fWorkStation* client1 = workStationExemplar->make(client);
     //    NOTES  : None
     //
     // copy: This method creates another copy of an object.
     //    INPUT  : None
     //    OUTPUT : return - fWorkStation *
     //    EXAMPLE: None
     //    NOTES  : None
     //-----------------------------------------------------------
     REGISTERMAKEDECLARE(WORKSTATIONSELECTOR)
```

-21-

```
        static fWorkStation* make(WORKSTATIONSELECTOR selector, VOID *ptr =
    NULL);
        static fWorkStation* make(WORKSTATIONSELECTOR selector, LONG x, VOID
    *ptr = NULL);
        virtual fWorkStation* copy() const;
        // :H2 DESTRUCTOR: Default destructor
        //------------------------------------------------------------
        // -u01WorkStation1: u01WorkStation1 destructor
        //     INPUT  : None
        //     OUTPUT : None
        //     EXAMPLE: None
        //     NOTES  : None
        //------------------------------------------------------------
        virtual -u01WorkStation1();
        // :H2 Status: Workstation status
        //------------------------------------------------------------
        // enable: Determine if the workstation is enabled.
        //     INPUT  : None
        //     OUTPUT : return - BOOLEAN - TRUE if enabled, FALSE if disabled
        //     EXAMPLE: work.enable();
        //     NOTES  : None
        //
        // setEnable: Enable the workstation.
        //     INPUT  : None
        //     OUTPUT : None
        //     EXAMPLE: work.setEnable();
        //     NOTES  : None
        //
        // setDisable: Disable the workstation.
        //     INPUT  : None
        //     OUTPUT : None
        //     EXAMPLE: work.setDisable();
        //     NOTES  : None
        //------------------------------------------------------------
        virtual BOOL enable() const;
        virtual VOID setEnable();
        virtual VOID setDisable();
        DYNAMICCASTDECLARE(u01WorkStation1, fWorkStation,
    WORKSTATIONSELECTOR)
        // :H2 CONSTRUCTOR: Default constructor
        //------------------------------------------------------------
        // u01WorkStation1: Default Constructor
        //     INPUT  : None
        //     OUTPUT : None
        //     EXAMPLE: None
        //     NOTES  : None
        //
        // u01WorkStation1: Copy Constructor
        //     INPUT  : u01WorkStation1 & - workstation to copy
        //     OUTPUT : None
        //     EXAMPLE: None
        //     NOTES  : None
        //------------------------------------------------------------
    protected:
        u01WorkStation1();
        u01WorkStation1(const u01WorkStation1& workStation);
```

```
        private:
            SUBCLASSLISTDECLARE
            BOOL newEnableD;  // new workstation indicator}; #endif
        // :H1 U01WORB2.CPP: START OF SPECIFICATIONS
        //------------------------------------------------------------
        //
        // Module Name: U01WORB2.CPP
        //
        // Description: This module defines the behavior of the u01WorkStation1 class.
        //
        //
        //   (C) Copyright IBM Corp. 1993
        //   All rights reserved.
        //
        // Function/Class: This module defines the behavior of the u01WorkStation1 class.
        //                 This is an example of how to use exemplars.
        //
        // Notes: None.
20      //
        // Change Activity ------------------------------------------
        //
        // END-OF-SPECIFICATIONS ------------------------------------

        #include "finclb.hpp"
        #include "fregisn.hpp"
        #include "u01worb2.hpp"

FST_CLASS_DEFS(u01WorkStation1)
        // register the class
        REPLACEREGISTERMAKEINSTANCE(u01WorkStation1, WORKSTATION1,
        WORKSTATIONMAKE, fWorkStation::make)
        REPLACEREGISTERMAKEINSTANCE(u01WorkStation1, WORKSTATION1,
        WORKSTATIONMAKE1, fWorkStation::make)

// subclass list
        SUBCLASSLISTINSTANCE(u01WorkStation1)

        // This method registers subclass exemplars.
        REGISTERMAKESUBCLASSCONSTRUCTOR(fWorkStation1, u01WorkStation1,
         WORKSTATIONSELECTOR)

// This is the u01WorkStation1 destructor.
        u01WorkStation1::~u01WorkStation1()
        {FST_ENTRY_1()}

// This method makes the u01WorkStation1 instances when fWorkStation1 make is.
        // requested.
        fWorkStation* u01WorkStation1::make(WORKSTATIONSELECTOR selector, VOID
        *ptr)
        {
         fWorkStation* ret = NULL;
         FST_ENTRY_1()
            // if selector is WORKSTATION1 (which this object replaces)
```

```
                                    -23-
        if (selector = = WORKSTATION1)
          {
            // if create object instance error
            if ((ret = new u01WorkStation1()) = = NULL)
              {
                // log error and exit
                FERROR_SC(errorPtr, fNewFailure, FE_NEW_FAILURE, NULL)
                errorPtr->logNewFailure(FPRB_MAC(IBM, F_PROBE_1));
              }
          } return ret;
      }

      // This method makes the u01WorkStation1 instances when fWorkStation1 make is.
      // requested.
      fWorkStation* u01WorkStation1::make(WORKSTATIONSELECTOR selector, LONG
      x, VOID *ptr)
      {
        fWorkStation* ret = NULL;
        FST_ENTRY_1()

// if selector is WORKSTATION1 (which this object replaces)
        if (selector = = WORKSTATION1)
          {
            // if create object instance error
            if ((ret = new u01WorkStation1()) = = NULL)
              {
                // log error and exit
30              FERROR_SC(errorPtr, fNewFailure, FE_NEW_FAILURE, NULL)
                errorPtr->logNewFailure(FPRB_MAC(IBM, F_PROBE_3));
              }
          }

        return ret;
      }

// This method casts from a fWorkStation to a u01WorkStation1.
      EXEMPLARDYNAMICCAST(u01WorkStation1)
      // This method returns the object type.
      EXEMPLARTYPE(u01WorkStation1, WORKSTATIONSELECTOR,
      U01WORKSTATION1)

      // This is the u01WorkStation copy constructor.
      fWorkStation* u01WorkStation1::copy() const
      {
        fWorkStation* ret = NULL;
        FST_ENTRY_1()
        // if create new copy error
        if ((ret = new u01WorkStation1(*this)) = = NULL)
          {
            // log error and exit
            FERROR_SC(errorPtr, fNewFailure, FE_NEW_FAILURE, NULL)
            errorPtr->logNewFailure(FPRB_MAC(IBM, F_PROBE_2));
```

-24-

```
        } return ret;
      }

// This is the u01WorkStation1 default constructor.
    u01WorkStation1::u01WorkStation1()
      : fWorkStation1()
    {
      FST_ENTRY_1()
    }

// This method is the u01WorkStation default copy constructor.
    u01WorkStation1::u01WorkStation1(const u01WorkStation1& workStation)
      : fWorkStation1(workStation),
        newEnableD (workStation.newEnableD)
    {
      FST_ENTRY_1()
    }

// This method replaces return the workstation enable status method.
    BOOL u01WorkStation1::enable() const
    {
      FST_ENTRY_1()

return newEnableD;
    }

// This method replaces the enable workstation method.
    VOID u01WorkStation1::setEnable()
    {
      FST_ENTRY_1()

// set workstation enabled
      newEnableD = TRUE;
    }

// This method replaces the disable workstation method.
    VOID u01WorkStation1::setDisable()
    {
      FST_ENTRY_1()

// set workstation disabled
      newEnableD = FALSE;
    }
    // :H1 XWORKSB2.CPP: START OF SPECIFICATIONS
    //-------------------------------------------------------------
    //
    // Module Name: XWORKSB2.CPP
    //
    // Description: This module unit tests the WorkStation object.
    //
    //    (C) Copyright IBM Corp. 1993
    //    All rights reserved.
```

```
//
// Function/Class: The following is the object hierarchy created by
//              this program.
//
// ISortedSet              fObject
//    |    |                 |
//    |  fSubclassList  +---+-------+-----------+
//    |                 |   |       |           |
// fExemplarList  fExemplarEntry fWorkStation fExemplar
//                                 |
//                                 |
//                                 |
//                             fWorkStation1
//                                 |
//   IBM Code                      |
// ------------------------------- | -------------------------------
//   Client Code              U01WorkStation1
//
//
//   The client code is presented to show what a user would have
//   to provide to sub-class one our our provided classes. The code
//   assumes that the client programmer has determined that they
//   wish to subclass the IBM-provided fWorkStation1 class). They have decided
//   to override ALL of the behavior of that class - so they use the
//   selector for the fWorkStation1 class which is WORKSTATION1.
//
// Notes: None.
//
// Change Activity -----------------------------------------------
//
// END-OF-SPECIFICATIONS ----------------------------------------- include <iostream.h>
include "finclb.hpp"
#include "u01worb2.hpp"
#include "fworksb2.hpp"
#include "fworksb3.hpp"

SHORT main(SHORT argc, CHAR *argv [])
{
 SHORT caseindex;

// if number of arguements error
 if (argc != 2)
   {
    cout << "Arguements error" << endl;
    return -1;
   }

// if arguement conversion error
 if (sscanf (argv[1], "%d", &caseindex) != 1)
   {
    cout << "Conversion error" << endl;
    return -2;
   }
```

```
                                       -26- cout << "Starting test case " << caseindex << endl;

// select test case to run
           switch (caseindex)
             {
             case 1: // test create object and setEnable method
               {
                 // create replacement fWorkStation1 object
                 fWorkStation* work1 = fWorkStation::make(WORKSTATION1);
                 // enable the workstation
                 work1->setEnable();
                 break;
               }
             case 2: // test setEnable and enable methods
               {
                 // create replacement fWorkStation1 object
                 fWorkStation* work1 = fWorkStation::make(WORKSTATION1);
20
                 // enable the workstation
                 work1->setEnable();

// if enable workstation error
25               if (work1->enable() != TRUE)
                   {
                     cout << "Error 2" << endl;
                     return 2;
                   }
                 break;
               } case 3: // test setDisable and enable methods
               {
                 // create replacement fWorkStation1 object
                 fWorkStation* work1 = fWorkStation::make(WORKSTATION1);

// enable the workstation
                 work1->setEnable();

// disable the workstation
                 work1->setDisable();

                 // if enable workstation error
                 if (work1->enable() != FALSE)
                   {
                     cout << "Error 3" << endl;
                     return 3;
50                 } break;
               }
```

```
case 4: // test copy an object
  {
    // create replacement fWorkStation1 object
    fWorkStation* work1 = fWorkStation::make(WORKSTATION1);

// enable the workstation
    work1->setEnable();

// if enable workstation error
    if (work1->enable() != TRUE)
    {
      cout << "Error 4" << endl;
      return 4;
    }

// copy workstation
    fWorkStation* work2 = work1->copy();

// if workstation not enabled
    if (work2->enable() != TRUE)
    {
      cout << "Error 6" << endl;
      return 6;
    } break;
  } case 5: // reset an fWorkStation1 using casting
  {
    // create replacement fWorkStation1 object
    fWorkStation* work1 = fWorkStation::make(WORKSTATION1);

fWorkStation1* work2 = EXEMPLARCAST(fWorkStation1, work1);

// reset the workstation
    work2->reset();

break;
  } case 6: // test valid cast
  {
    // create replacement fWorkStation1 object
    fWorkStation* work1 = fWorkStation::make(WORKSTATION1);

fWorkStation* work2 = EXEMPLARCAST(fWorkStation, work1);

break;
  } case 7: // reset an u01WorkStation1 using casting
  {
    // create replacement fWorkStation1 object
    fWorkStation* work1 = fWorkStation::make(WORKSTATION1);
```

```
                            -28- u01WorkStation1* work2 = EXEMPLARCAST(u01WorkStation1, work1);

// reset the workstation
        work2->reset();
        break;
      } case 8: // test invalid no fail cast
        {
          // create replacement fWorkStation1 object
          fWorkStation* work1 = fWorkStation::make(WORKSTATION1);

fWorkStation* work3 = NULL;
          fWorkStation* work2 = EXEMPLARNOFAILCAST(fWorkStation1, work3);

if (work2 != NULL)
            {
              cout << "Error 2" << endl;
              return 2;
            } break;
        }
      case 9: // reset an fWorkStation1 using no fail casting
        {
          // create replacement fWorkStation1 object
          fWorkStation* work1 = fWorkStation::make(WORKSTATION1);
          fWorkStation1* work2 = EXEMPLARNOFAILCAST(fWorkStation1, work1);

if (work2 == NULL)
            {
              cout << "Error 2" << endl;
              return 2;
            }

// reset the workstation
40        work2->reset();

break;
        }

      case 10: // test valid no fail cast
        {
          // create replacement fWorkStation1 object
          fWorkStation* work1 = fWorkStation::make(WORKSTATION1);

          fWorkStation* work2 = EXEMPLARNOFAILCAST(fWorkStation, work1);

if (work2 == NULL)
            {
              cout << "Error 2" << endl;
55            return 2;
            }
```

```
            break;
          } case 11: // reset an u01WorkStation1 using casting
          {
            // create replacement fWorkStation1 object
            fWorkStation* work1 = fWorkStation::make(WORKSTATION1);

u01WorkStation1* work2 = EXEMPLARNOFAILCAST(u01WorkStation1,
        work1);

if (work2 == NULL)
              {
                cout << "Error 2" << endl;
                return 2;
              }

// reset the workstation
            work2->reset();

break;
          } case 12: // test assitional make method
          {
            // create replacement fWorkStation1 object
            fWorkStation* work1 = fWorkStation::make(WORKSTATION1, 0L);

break;
          } default:
          cout << "Invalid test case number" << endl;
          return -3;

} cout << "OK." << endl;
      return 0;
    }

// :H1 FWORKSB2.HPP: START OF SPECIFICATIONS
    //------------------------------------------------------------
    //
    // Module Name: FWORKSB2.HPP
    //
    // Description: This module defines the behavior of the fWorkStation class.
    //
    //
    //  (C) Copyright IBM Corp. 1993
    //  All rights reserved.
    //
    // Function: This module defines the behavior of the fWorkStation class.
    //           This is an example of how to use exemplars.
    //
```

-30-

```
//
// Notes: None.
//
// Change Activity ---------------------------------------------
// END-OF-SPECIFICATIONS --------------------------------------- ifndef FWORKSB2_HPP
define FWORKSB2_HPP

//---------------------------------------------------------------
//
// This enumeration provides the selector list for this Exemplar
// Base Class. A user wishing to add their own type must add
// additional selectors in the include file.
//
//---------------------------------------------------------------
enum WORKSTATIONSELECTOR
   {
     WORKSTATION, // base class
     WORKSTATION1
     #include <fworksb.sel> // include additional user selectors
   };

// :H2 fWorkStation: Workstation
//---------------------------------------------------------------
//
// The fWorkstation represents a workstation.
// This could be either a register or server.
//
//--------------------------------------------------------------- class fWorkStation : public fObject
   {
     FST_CLASS_DECS(fWorkStation)
     public:
      // define the make method signature
      typedef fWorkStation* (*WORKSTATIONMAKE)(WORKSTATIONSELECTOR, VOID*);
      typedef fWorkStation* (*WORKSTATIONMAKE1)(WORKSTATIONSELECTOR, LONG, VOID*);
      // :H2 CONSTRUCTORS: Create new workstation objects
      //------------------------------------------------------
      // make: This method examines the value of the selector and
      //      calls the subclass to create the object. If the a subclass creates
      //      the object it return a pointer to the object. If not,
      //      it returns NULL.
      //      INPUT : WORKSTATIONSELECTOR - object type to create
      //              VOID * - additional parameters
      //      OUTPUT : return - fWorkStation *
      //      EXAMPLE: fWorkStation* client1 = fWorkStation::make(client);
      //      NOTES : None
      //
      // make: This method examines the value of the selector and
      //      calls the subclass to create the object. If the a subclass creates
      //      the object it return a pointer to the object. If not,
```

```
//      it returns NULL.
//      INPUT : WORKSTATIONSELECTOR - object type to create
//              LONG - dummy parameter
//              VOID * - additional parameters
//      OUTPUT : return - fWorkStation *
//      EXAMPLE: fWorkStation* client1 = fWorkStation::make(client);
//      NOTES : None
//
// copy: This method creates another copy of an object.
//      INPUT : None
//      OUTPUT : return - fWorkstation *
//      EXAMPLE: None
//      NOTES : None
//-----------------------------------------------------------
REGISTERMAKEDECLARE(WORKSTATIONSELECTOR)
    static fWorkStation* make(WORKSTATIONSELECTOR selector, VOID *ptr = NULL);
    static fWorkStation* make(WORKSTATIONSELECTOR selector, LONG x, VOID *ptr = NULL);
    virtual fWorkStation* copy() const;
// :H2 DESTRUCTOR: Default destructor
//-----------------------------------------------------------
//      ~fWorkStation: fWorkStation destructor
//      INPUT : None
//      OUTPUT : None
//      EXAMPLE: None
//      NOTES : None
//-----------------------------------------------------------
    virtual ~fWorkStation();
// :H2 Status: Workstation status
//-----------------------------------------------------------
// enable: Determine if the workstation is enabled.
//      INPUT : None
//      OUTPUT : return - TRUE if enabled, FALSE if disabled
//      EXAMPLE: work.enable();
//      NOTES : None
//
// setEnable: Enable the workstation.
//      INPUT : None
//      OUTPUT : None
//      EXAMPLE: work.setEnable();
//      NOTES : None
//
// setDisable: Disable the workstation.
//      INPUT : None
//      OUTPUT : None
//      EXAMPLE: work.setDisable();
//      NOTES : None
//-----------------------------------------------------------
    virtual BOOL enable() const;
    virtual VOID setEnable();
    virtual VOID setDisable();
    DYNAMICCASTDECLARE(fWorkStation, fWorkStation, WORKSTATIONSELECTOR)
// :H2 CONSTRUCTOR: Default contructor
//-----------------------------------------------------------
```

-32-

```
// fWorkStation: Default Constructor
//    INPUT  : None
//    OUTPUT : None
//    EXAMPLE: None
//    NOTES  : None
//
// fWorkStation: Copy Constructor
//    INPUT  : fWorkStation & - workstation to copy
//    OUTPUT : None
//    EXAMPLE: None
//    NOTES  : None
//-----------------------------------------------------------
protected:
    fWorkStation();
    fWorkStation(const fWorkStation& workStation);
private:
    static fExemplarList *eListD;
    SUBCLASSLISTDECLARE
    BOOL enableD;
};

#endif

/* Page Tune segment definitions - Do NOT move/remove! */
#define _FWORKSB2_CPP_
#include <fstpage.tun>
/* End of Page Tune segment definitions */
```

-33-

```cpp
// :H1 FWORKSB2.CPP: START OF SPECIFICATIONS
//-----------------------------------------------------------------
//
// Module Name: FWORKSB2.CPP
//
// Description: This module defines the behavior of the fWorkStation class.
//
//
//   (C) Copyright IBM Corp. 1993
//   All rights reserved.
//
// Function/Class: This module defines the behavior of the fWorkStation class.
//                 This is an example of how to use exemplars.
//
//
// Notes: None.
//
// Change Activity ----------------------------------------------
//
// END-OF-SPECIFICATIONS ---------------------------------------- include "finclb.hpp"
include "fworksb2.hpp"

// exemplar list
fExemplarList *fWorkStation::eListD = (fExemplarList *)NULL;

// subclass list
SUBCLASSLISTINSTANCE(fWorkStation)

FST_CLASS_DEFS(fWorkStation)

// This method registers subclass exemplars.
REGISTERMAKEBASECONSTRUCTOR(fWorkStation, WORKSTATIONSELECTOR)

// This is the fWorkStation destructor.
fWorkStation::~fWorkStation()
{
  FST_ENTRY_1()
}

// This method makes the fWorkStation instances.
fWorkStation* fWorkStation::make(WORKSTATIONSELECTOR selector, VOID *ptr)
{
  FST_ENTRY_1()

fWorkStation* retval = NULL;

// if exemplar list has elements
  if (eListD != NULL)
    {
      fExemplarList::Cursor cursor(*eListD);

// for all subclasses
      forCursor (cursor)
        {
```

-34-

```
              // get next entry
              const fExemplarEntry& entry = eListD->elementAt(cursor);

// if correct subclass and make found
              if (selector == entry.selector()
                  &&
                  (WORKSTATIONMAKE)fWorkStation::make == entry.method ())
                {
                  // get subclass pointer
                  WORKSTATIONMAKE subclassMake =
              (WORKSTATIONMAKE)entry.exemplar();

// if not the exemplar base
                  if (subclassMake != (WORKSTATIONMAKE)fWorkStation::make)
                    // if subclass was found
                    if ((retval = subclassMake(selector, ptr)) != NULL)
                      // break out of subclass loop
                      break;
                }
            }
          }

// if selector error
          if (retval == NULL)
            {
              // log error and exit
              FERROR_SC(errorPtr, fMakeError, FE_MAKE_ERROR, NULL)
              errorPtr->logMakeError(FPRB_MAC(IBM, F_PROBE_1), selector);
            }
          return retval;
        }

// This method makes the fWorkStation instances.
        fWorkStation* fWorkStation::make(WORKSTATIONSELECTOR selector, LONG x,
        VOID *ptr)
        {
          FST_ENTRY_1()

          fWorkStation* retval = NULL;

// if exemplar list has elements
          if (eListD != NULL)
            {
45            fExemplarList::Cursor cursor(*eListD);

// for all subclasses
              forCursor (cursor)
                {
50              // get next entry
                const fExemplarEntry& entry = eListD->elementAt(cursor);

// if correct subclass and make found
                if (selector == entry.selector()
55                  &&
                    (WORKSTATIONMAKE1)fWorkStation::make == entry.method ())
```

-35-

```
        {
            // get subclass pointer
            WORKSTATIONMAKE1 subclassMake =
          (WORKSTATIONMAKE1)entry.exemplar();

// if not the exemplar base
            if (subclassMake != (WORKSTATIONMAKE1)fWorkStation::make)
                // if subclass was found
                if ((retval = subclassMake(selector, x, ptr)) != NULL)
                    // break out of subclass loop
                    break;
        }
    }
}

// if selector error
    if (retval == NULL)
    {
      // log error and exit
      FERROR_SC(errorPtr, fMakeError, FE_MAKE_ERROR, NULL)
      errorPtr->logMakeError(FPRB_MAC(IBM, F_PROBE_3), selector);
    } return retval;
}

// This is the fWorkStation copy constructor.
fWorkStation* fWorkStation::copy() const
{
  fWorkStation* ret = NULL;
  FST_ENTRY_1()

// if create new copy error
  if ((ret = new fWorkStation(*this)) == NULL)
    {
      // log error and exit
      FERROR_SC(errorPtr, fNewFailure, FE_NEW_FAILURE, NULL)
      errorPtr->logNewFailure(FPRB_MAC(IBM, F_PROBE_2));
    } return ret;
}

// This is the fWorkStation default constructor.
fWorkStation::fWorkStation()
{
  FST_ENTRY_1()
}

// This method returns the workstation enable status.
BOOL fWorkStation::enable() const
{
  FST_ENTRY_1()

return enableD;
}
```

-36-

```
    // This method enables the workstation.
    VOID fWorkStation::setEnable()
    {
      FST_ENTRY_1()
      // set workstation enabled
      enableD = TRUE;
    }

    // This method disables the workstation.
    VOID fWorkStation::setDisable()
    {
      FST_ENTRY_1()

      // set workstation disabled
      enableD = FALSE;
    }

// This method casts to a fWorkStation.
    EXEMPLARDYNAMICCAST(fWorkStation)

// This method returns the object type.
    EXEMPLARTYPE(fWorkStation, WORKSTATIONSELECTOR, WORKSTATION)

    // This method is the fWorkStation default copy constructor.
    fWorkStation::fWorkStation(const fWorkStation& workStation)
      : enableD (workStation.enableD)
    {
      FST_ENTRY_1()
    }
```

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of generating a user defined object class after build-time in an object oriented computing environment on a computing platform including first and second object classes arranged in an inheritance hierarchy, wherein said second object class is derived from said first object class, said first and second object classes generated before build-time, said method comprising the steps of:

providing said first and second object classes with respective first and second selector identifiers;

providing said first and second object classes with respective first and second class identifiers;

registering said first and second selector identifiers with respective first and second object class names in a first portion of a registration table linked to said first object class;

registering said first and second class identifiers with respective first and second object class names in a first subclass table linked to said first object class; and registering said second class identifier with said second object class name in a second subclass table linked to said second object class.

2. A method according to claim 1, wherein the following steps are performed to generate a user defined object class after build-time:

deriving a third object class having a third subclass table from said second object class;

assigning a value of said second object class selector identifier to a third object class selector identifier;

registering said assigned third object class selector value with a third object class name in a second portion of the first object class registration table;

assigning a unique class identifier to said third object class; and registering said assigned unique class identifier with said third object class name in each one of said first, second, and third subclass tables.

3. A method according to claim 2, wherein the following steps are performed to instantiate an object from a user defined object class generated after build-time:

transmitting, to said first object class, a request to instantiate an object from said third object class coupled with the value of said third object class selector identifier;

searching said first object class registration table for said transmitted selector identifier value, wherein said second portion of said first object class registration table is searched prior to said first portion of said first object class registration table; and instantiating an object from the object class registered in the registration table having a selector identifier value first matching the transmitted selector identifier value.

4. A method according to claim 3, wherein the following steps are performed to validate an object instantiated from a user defined object class generated after build-time:

transmitting, to said third object class; the value of the class identifier of said third object class;

searching for the transmitted class identifier value and associated object class name in the subclass table of said third object class; and requesting the identified object class to verify that its class identifier value matches the class identifier value of the object class requested.

5. A method according to claim 1, wherein said first object class is an exemplar object class.

6. A method for generating a user defined object class after build-time according to claim 2, further comprising the steps of modifying or deleting attributes inherited from said second object class.

7. A method for generating a user defined object class after build-time according to claim 2, further comprising the steps of modifying or deleting methods inherited from said second object class.

8. A system for generating a user defined object class after build-time in an object oriented computing environment on a computing platform including first and second object classes arranged in an inheritance hierarchy, wherein said second object class is derived from said first object class, said first and second object classes generated before build-time, said system comprising:

means for providing said first and second object classes with respective first and second selector identifiers;

means for providing said first and second object classes with respective first and second class identifiers;

a registration table linked to said first object class;

means for registering said first and second selector identifiers with respective first and second object class names in a first portion of said registration table;

a first subclass table linked to said first object class;

a second subclass table linked to said second object class;

means for registering said first and second class identifiers with respective first and second object class names in said first subclass table; and means for registering said second class identifier with said second object class name in said second subclass table.

9. A system according to claim 8, further comprising:

means for deriving a third object class having a third subclass table from said second object class;

means for assigning a value of said second object class selector identifier to a third object class selector identifier;

means for registering said assigned third object class selector value with a third object class name in a second portion of the first object class registration table;

means for assigning a unique class identifier to said third object class; and means for registering said assigned unique class identifier with said third object class name in each one of said first, second, and third subclass tables.

10. A system according to claim 9, further comprising:

means for transmitting, to the first object class, a request to instantiate an object from said third object class coupled with the value of the third object class selector identifier;

means for searching said first object class registration table for said transmitted selector identifier value wherein said second portion of said first object class registration table is searched prior to said first portion of said first object class registration table; and means for instantiating an object from the object class registered in the registration table with a selector identifier value first matching the transmitted selector identifier value.

11. A system according to claim 10, further comprising:

means for transmitting, to the third object class, the value of the class identifier of the third object class;

means for searching for the transmitted value and associated object class name of the class identifier in the subclass table of said third object class; and means for requesting the identified object class to verify that its class identifier value matches the class identifier value of the object class requested.

12. A system according to claim 8, wherein said first object class is an exemplar object class.

13. A system according to claim 9, further comprising means for modifying or deleting attributes inherited from said second object class.

14. A system according to claim 9, further comprising means for modifying or deleting methods inherited from said second object class.

15. A computer program product comprising:

a computer usable medium having computer readable program code means embodied in said medium for generating a new object class after build-time in an object oriented computing environment on a computing platform including first and second object classes arranged in an inheritance hierarchy, wherein said second object class is derived from said first object class, said first and second object classes generated before build-time;

computer readable program code means for providing said first and second object classes with respective first and second selector identifiers;

computer readable program code means for providing said first and second object classes with respective first and second class identifiers;

computer readable program code means for registering said first and second selector identifiers with respective first and second object class names in a first portion of a registration table linked to said first object class;

computer readable program code means for registering said first and second class identifiers with respective first and second object class names in a first subclass table linked to said first object class; and computer readable program code means for registering said second class identifier with said second object class name in a second subclass table linked to said second object class.

16. A computer program product according to claim 15, further comprising:

computer readable program code means for deriving a third object class having a third subclass table from said second object class;

computer readable program code means for assigning a value of said second object class selector identifier to a third object class selector identifier;

computer readable program code means for registering said assigned third object class selector value with a third object class name in a second portion of the first object class registration table;

computer readable program code means for assigning a unique class identifier to said third object class; and computer readable program code means for registering said assigned unique class identifier with said third object class name in each one of said first, second, and third subclass tables.

17. A computer program product according to claim 16, further comprising:

computer readable program code means for transmitting, to the first object class, a request to instantiate an object from said third object class coupled with the value of the third object class selector identifier;

computer readable program code means for searching said first object class registration table for said transmitted selector identifier value wherein said second portion of said first object class registration table is searched prior to said first portion of said first object class registration table; and computer readable program code means for instantiating an object from the object class registered in the registration table with a selector identifier value first matching the transmitted selector identifier value.

18. A computer program product according to claim 17, further comprising:

computer readable program code means for transmitting, to the third object class, the value of the class identifier of the third object class;

computer readable program code means for searching for the transmitted value and associated object class name of the class identifier in the subclass table of said third object class; and computer readable program code means for requesting the identified object class to verify that its class identifier value matches the class identifier value of the object class requested.

19. A computer program product according to claim 16, further comprising computer readable program code means for modifying or deleting attributes inherited from said second object class.

20. A computer program product according to claim 16, further comprising computer readable program code means for modifying or deleting methods inherited from said second object class.

21. A method for substituting run-time generated object classes for build-time generated object classes in an object oriented computing system, said object oriented computing system comprising a parent object class and a plurality of child object classes generated at build-time, each one of said child classes having a unique identifier, said parent object class having a list for calling the build-time child object classes via their respective identifiers, said method comprising the steps of:

generating a child object class at run-time;

assigning to the run-time generated child object class the identifier of one of the build-time generated child object classes; and adding the run-time generated child object class identifier to the calling list of the parent object class such that the run-time generated child object class is called instead of the build-time generated child object class having the same identifier.

22. A method according to claim 21, wherein objects instantiated from a run-time generated child object class are validated when called.

* * * * *